(12) United States Patent
Hill

(10) Patent No.: US 11,823,288 B1
(45) Date of Patent: Nov. 21, 2023

(54) METHODS AND SYSTEMS FOR ACTIVITY DONATION

(71) Applicant: Benjamin R. Hill, Leominster, MA (US)

(72) Inventor: Benjamin R. Hill, Leominster, MA (US)

( * ) Notice: Subject to any disclaimer, the term of this patent is extended or adjusted under 35 U.S.C. 154(b) by 63 days.

(21) Appl. No.: 16/440,411

(22) Filed: Jun. 13, 2019

Related U.S. Application Data

(63) Continuation-in-part of application No. 15/785,493, filed on Oct. 17, 2017, now Pat. No. 11,321,747, which is a continuation-in-part of application No. 15/211,452, filed on Jul. 15, 2016, now Pat. No. 11,069,003.

(60) Provisional application No. 62/192,808, filed on Jul. 15, 2015, provisional application No. 62/684,418, filed on Jun. 13, 2018.

(51) Int. Cl.
*G06Q 40/00* (2023.01)
*G06Q 50/00* (2012.01)
*G06Q 30/0279* (2023.01)

(52) U.S. Cl.
CPC ........ *G06Q 50/01* (2013.01); *G06Q 30/0279* (2013.01)

(58) Field of Classification Search
CPC ... G06Q 50/01; G06Q 30/027; G06F 17/3089
See application file for complete search history.

(56) References Cited

U.S. PATENT DOCUMENTS

| | | |
|---|---|---|
| 7,080,916 B1 | 7/2006 | Ferrin et al. |
| 7,933,810 B2 | 4/2011 | Morgenstern |
| 7,970,657 B2 | 6/2011 | Morgenstern |
| 2008/0104496 A1 | 5/2008 | Williams et al. |
| 2009/0192873 A1 | 7/2009 | Marble |
| 2010/0114685 A1 | 5/2010 | Blass |
| 2011/0054986 A1 | 3/2011 | Rubin et al. |
| 2011/0295749 A1 | 12/2011 | Scalisi |
| 2012/0029981 A1 | 2/2012 | Barton |
| 2012/0233072 A1 | 9/2012 | Calman et al. |
| 2013/0091058 A1 | 4/2013 | Huster |
| 2013/0311391 A1 | 11/2013 | Tuggle |
| 2014/0172475 A1* | 6/2014 | Olliphant .......... G06Q 30/0279 705/5 |
| 2014/0258013 A1* | 9/2014 | Collins ............. G06Q 30/0256 705/26.3 |
| 2014/0278861 A1 | 9/2014 | Bush et al. |
| 2014/0304056 A1 | 10/2014 | Postrel |
| 2015/0026062 A1 | 1/2015 | Paulsen et al. |

(Continued)

OTHER PUBLICATIONS

How to Create an Encrypted Container File With BitLocker on Windows, published on Jul. 16, 2014.

(Continued)

*Primary Examiner* — Ojo O Oyebisi

(74) *Attorney, Agent, or Firm* — Culhane Meadows PLLC; Orlando Lopez

(57) ABSTRACT

A system of these teachings for providing value to a node created by an application and in one instance, providing a graphical activatable link (also referred to as a badge) related to an activity, includes a handheld mobile communication device, and a web site server configured to receive/send information from/to the handheld mobile communication device.

11 Claims, 72 Drawing Sheets

(56) References Cited

U.S. PATENT DOCUMENTS

| | | | |
|---|---|---|---|
| 2015/0066790 A1* | 3/2015 | DeSanti | G06Q 50/01 |
| | | | 705/319 |
| 2015/0310568 A1* | 10/2015 | Sadeghpour | G06Q 30/0217 |
| | | | 705/14.19 |
| 2016/0171570 A1 | 6/2016 | Dogin et al. | |
| 2016/0196589 A1* | 7/2016 | Subbarayan | H04L 67/306 |
| | | | 705/319 |
| 2017/0118147 A1 | 4/2017 | Dold et al. | |
| 2017/0221156 A1* | 8/2017 | Mingarelli | G06Q 50/01 |

OTHER PUBLICATIONS

Chapter 5 in Rafael Pass, Abhi Shelat, A Course in Cryptography@ 2010.

* cited by examiner

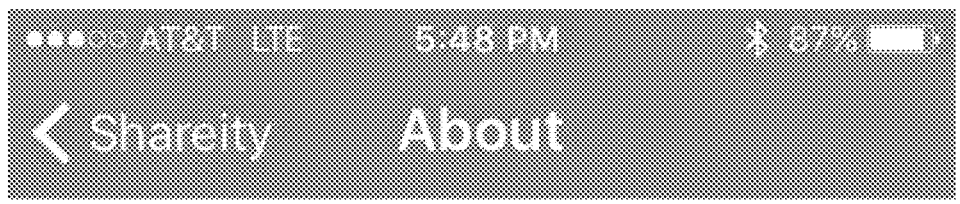
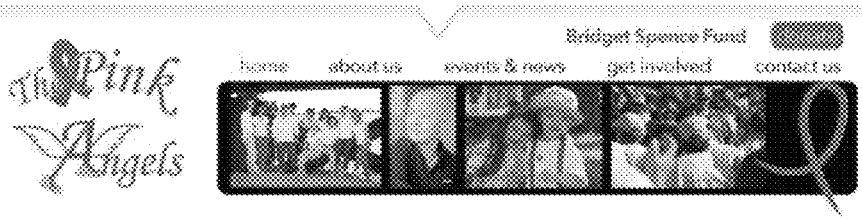
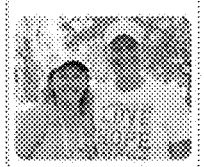
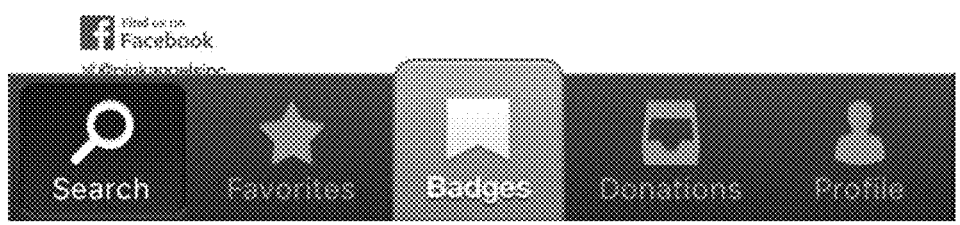
FIG. 10

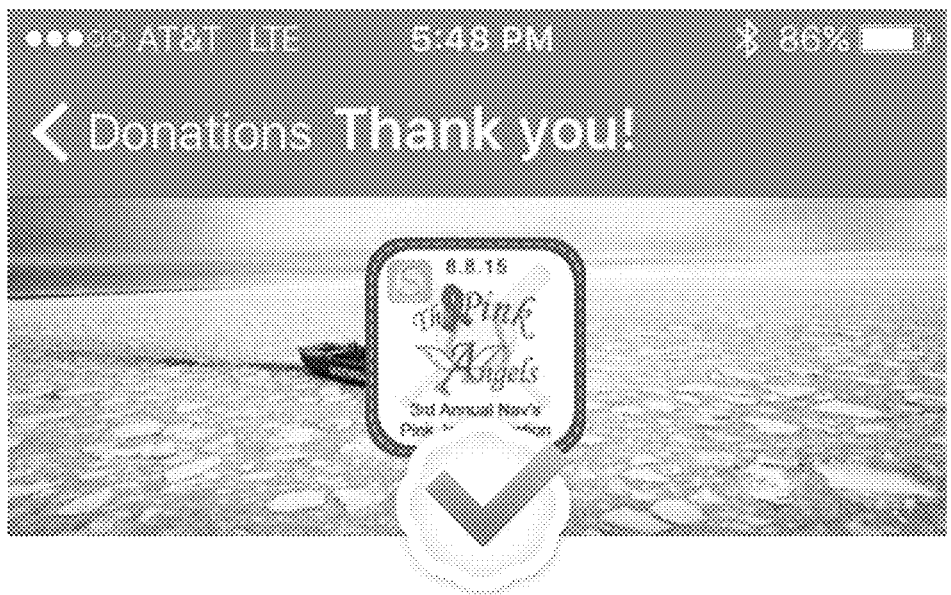
Thank you for your contribution of $562.00 in support of 3rd Annual Nav's Pink Jersey Auction! Your donation badge has been shared on the social networks you connected to your account.
FIG. 17

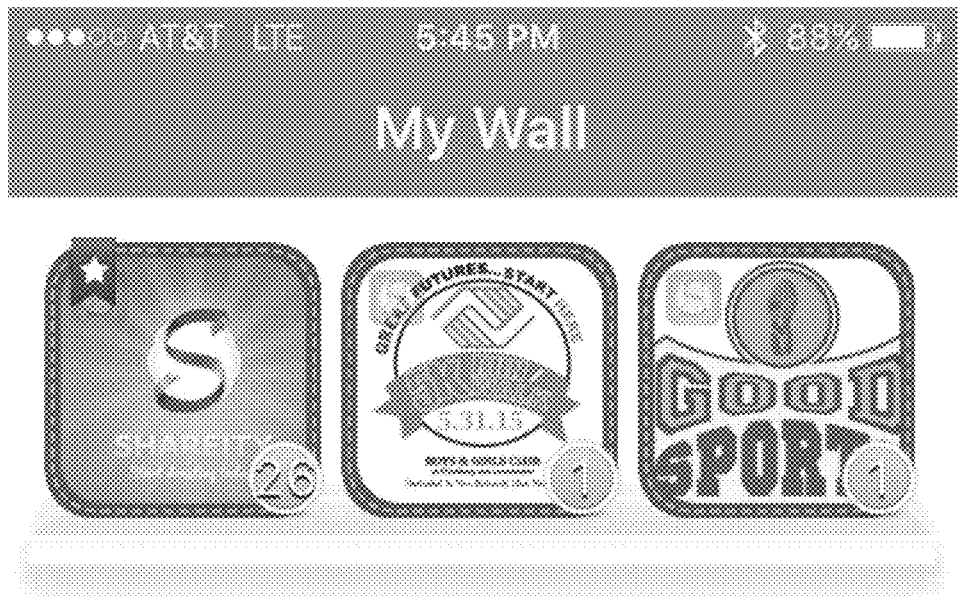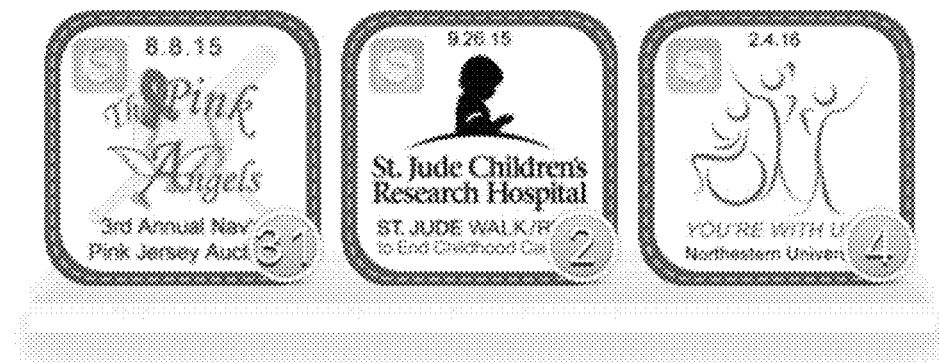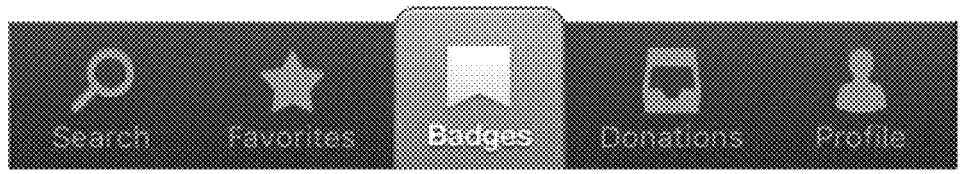
FIG. 18

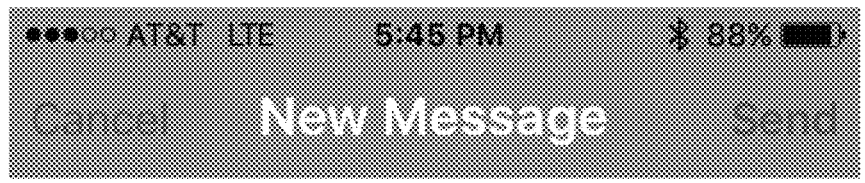
To:
Cc/Bcc, From: benhill04@me.com
Subject:
Join Me as a Proud Supporter of:
Fig. 18a

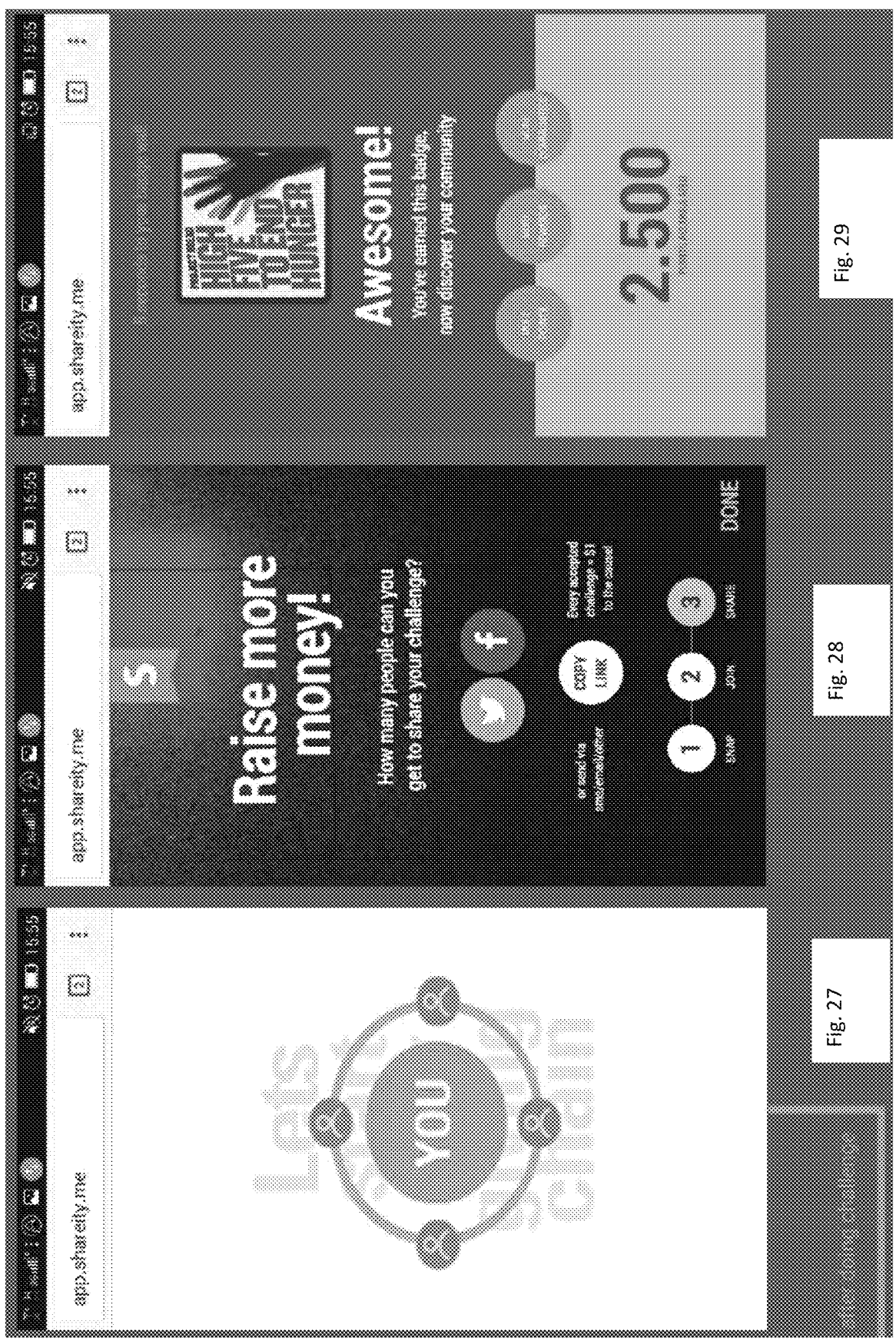

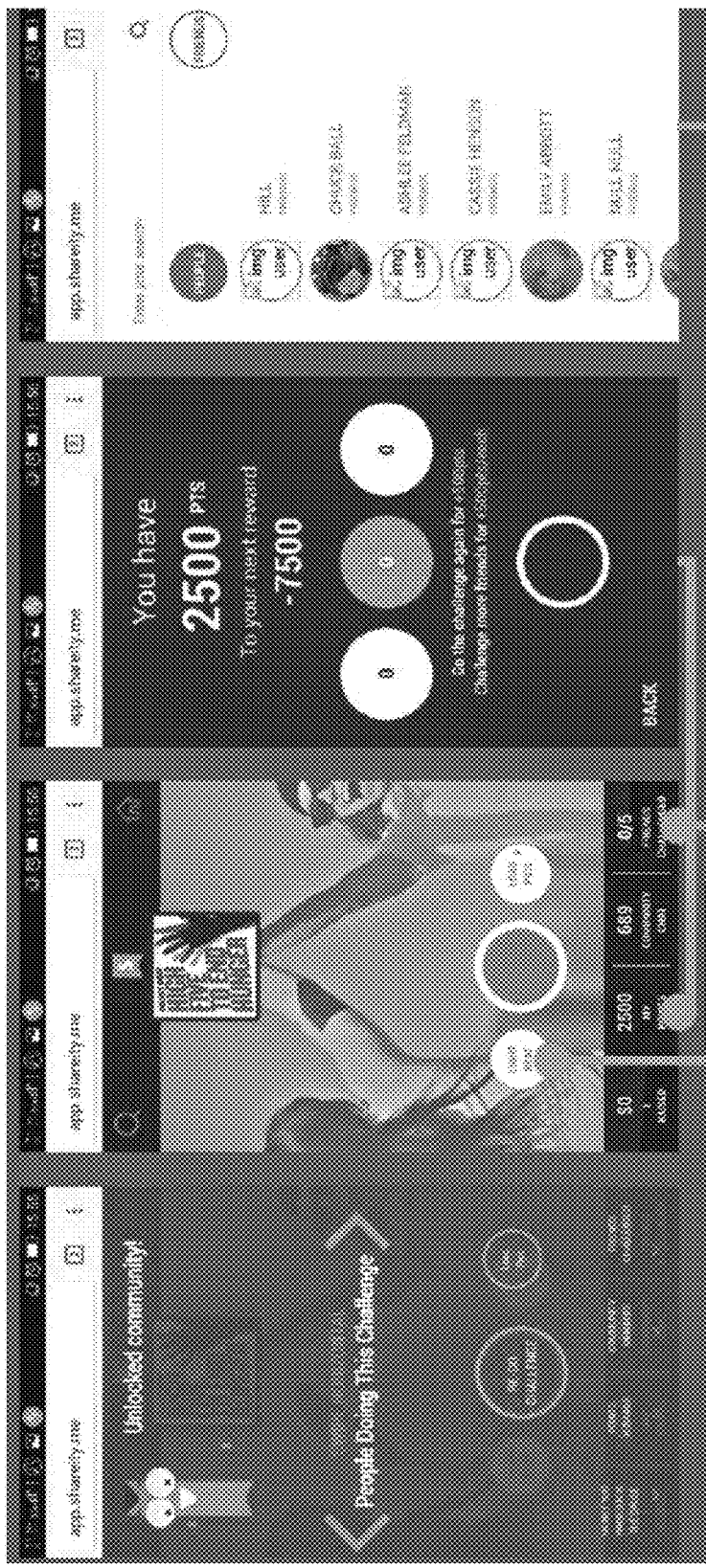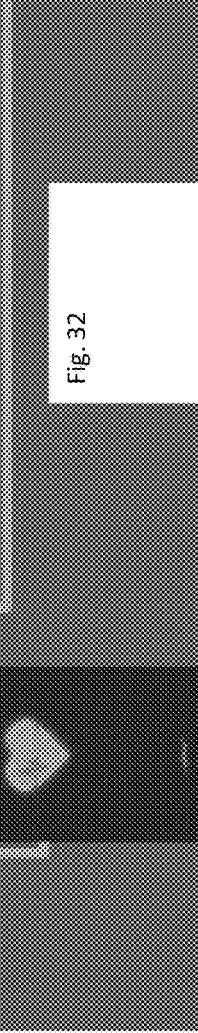

METHODS AND SYSTEMS FOR ACTIVITY DONATION

CROSS-REFERENCE TO RELATED APPLICATIONS

This application is a continuation in part of U.S. patent application Ser. No. 15/785,493, filed on Oct. 17, 2017, which is a continuation in part of U.S. patent application Ser. No. 15/211,452, filed on Jul. 15, 2016, which claims priority to U.S. Provisional Patent Application No. 62/192,808, filed on Jul. 15, 2015, entitled METHODS AND SYSTEMS FOR ACTIVITY DONATION, and this application also claims priority of U.S. Provisional Patent Application No. 62/684,418, filed on Jun. 13, 2018, entitled METHODS AND SYSTEMS FOR ACTIVITY DONATION, all of which are incorporated by reference herein in their entirety for all purposes.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

These teachings relate generally to providing value (sometimes referred to as monetizing) to actions and social influence data such as, but not limited to, links formed when a user performs an action and social data generated by sharing those links.

One exemplary embodiment occurs related to activities that generate donations to charities by responding to a challenge. Charity organizations operate often with voluntary staff, but nevertheless need plain money to address certain situations such as catastrophes and helping ill and/or poor people, among others. It is becoming more common to replace small business gifts with a donation to the charity and a card expressing that a donation has been made for the recipient. Perhaps even more common is the sending of cardboard based cards printed with a charity organization logo and text for the Red Cross®, WWF® and the like. The charity gains a small amount of money per each card purchased for the use.

The internet is quickly spreading to homes in developed countries and thereby gives rise to a number of electronic systems where a donation can be made. Such systems typically provide for voluntary credit to the charity or expose users to advertisements so that the site providing the donation service can utilize advertisers for accessing the donors. Some mobile telephone operators also support charities by donating a predetermined portion of their income. Such a method may ease the donating and help the charity, but, however, suffers from a given inflexibility: a user may not choose whom to aid and when, and the user cannot share her good spirits with a friend or business contact in a discreet and acceptable manner.

Although the Internet is almost ubiquitous, methods for rendering objects such as digital images tangible and marketable are not available. The existence of those methods will enhance the use of the Internet and the computer used to connect to the Internet as a means for obtaining, transferring, and exchanging objects such as digital images in a manner that the authenticity is preserved and renders the object tangible and marketable.

It is desired to provide new alternatives to carrying out donations and other crediting in general to desired parties. It is also desirable to enable capturing an ever-growing portion of people who donate to charities and other activities. There is also a need for methods for rendering objects actions such as digital images tangible and marketable and for providing value to the data from social interactions involving those actions and objects.

BRIEF SUMMARY

Method and systems for providing value (sometimes referred to as monetizing) to actions and social influence data such as, but not limited to, for monetizing links formed when a user performs an action and social data generated by sharing those links, are presented herein below.

New alternatives to carrying out donations and rendering objects such as digital images tangible and marketable are presented hereinbelow. Herein, the term "donations" is used in a broad sense and includes crediting in general to desired parties.

In one or more embodiments, the system of these teachings for providing value to a node created by an application includes a handled mobile communication device; and a server configured to receive information from the handheld mobile communication device.

The handheld mobile communication device and the server have one or more processors, the one or more processors being configured to:

send a request to the server for activities that require an action as a response, receive, from the server, activities that require an action as a response, select one activity that requires action as a response; the selection performed by a user of the handheld mobile device, create, upon performing the action, a node as a result of the action by the user; the node having a unique link, add information to the node as a user shares the unique link and/or performs actions, and provide a value to the node, the value related to at least one of a number of times the unique link has been shared, and a monetary impact of the action performed.

In one or more embodiments, the method of these teachings for providing value to a node created by an application includes creating a node as a result of an action by a user; the node having a unique link, adding information to the node as the user shares the unique link and/or performs actions, and providing a value to the node, the value related to at least one of a number of times the unique link has been shared and actions performed, and a monetary impact of the actions performed.

In one or more other embodiments, the method of these teachings for providing a graphical activatable link related to an activity includes selecting the activity from a activity list, the activity list being presented by an application in a handheld mobile communication device, making a donation to the activity using the handheld mobile communication device, wherein an exchange corresponding to the donation is a response to a challenge, the response to the challenge comprising providing a photo or providing a video, and communicating between the handheld mobile communication device and a web site server in order to verify that the donation has been made.

In one or more further embodiments, the method of these teachings includes communicating between a handheld mobile communication device and a web site server, receiving, at the handheld mobile communication device, a screen (webpage) from the website server; the screen, including a "button," which, when activated (clicked on) sends to the server a lighted screen. The lighted screen could be animation (light beat). The website server can keep track of the number of activations of the light beat button. If arranged as a challenge, a third party donates a predetermined amount for every activation of the button or for every activation of the button over a predetermined number of activations.

For a better understanding of the present teachings, together with other and further needs thereof, reference is made to the accompanying drawings and detailed description and its scope will be pointed out in the appended claims.

BRIEF DESCRIPTION OF THE DRAWINGS

FIGS. 1-18b are graphical representations of screenshots of one embodiment of the system of these teachings;

FIGS. 21-36 are graphical representations of screenshots of another embodiment of the system of these teachings;

DETAILED DESCRIPTION

The following detailed description presents the currently contemplated modes of carrying out the invention. The description is not to be taken in a limiting sense, but is made merely for the purpose of illustrating the general principles of the invention, since the scope of the invention is best defined by the claims.

"Application," as used herein in terms of an item downloaded to a mobile device, refers to a software module that, when downloaded to the mobile device and residing in a computer usable media in the mobile device and operated by a processor, causes a particular function or response.

A "graphically activatable link," as used herein, is a graphical object that enables activating a link, which link contains a location address or an identifier for a location address.

A graphical object, as used herein, is a graphical component that has properties; the graphical component can be stored, authenticated, can be used as a tangible marketable object.

A link (short for hyperlink), as used herein, is an HTML object that allows you to jump to a new location when you click or tap it (see, for example, https://techterms.com/definition/link).

A "merchant service," as used herein, is an authorized financial service that allows accepting credit card or bank debit card or similar transactions online.

Figure 19:
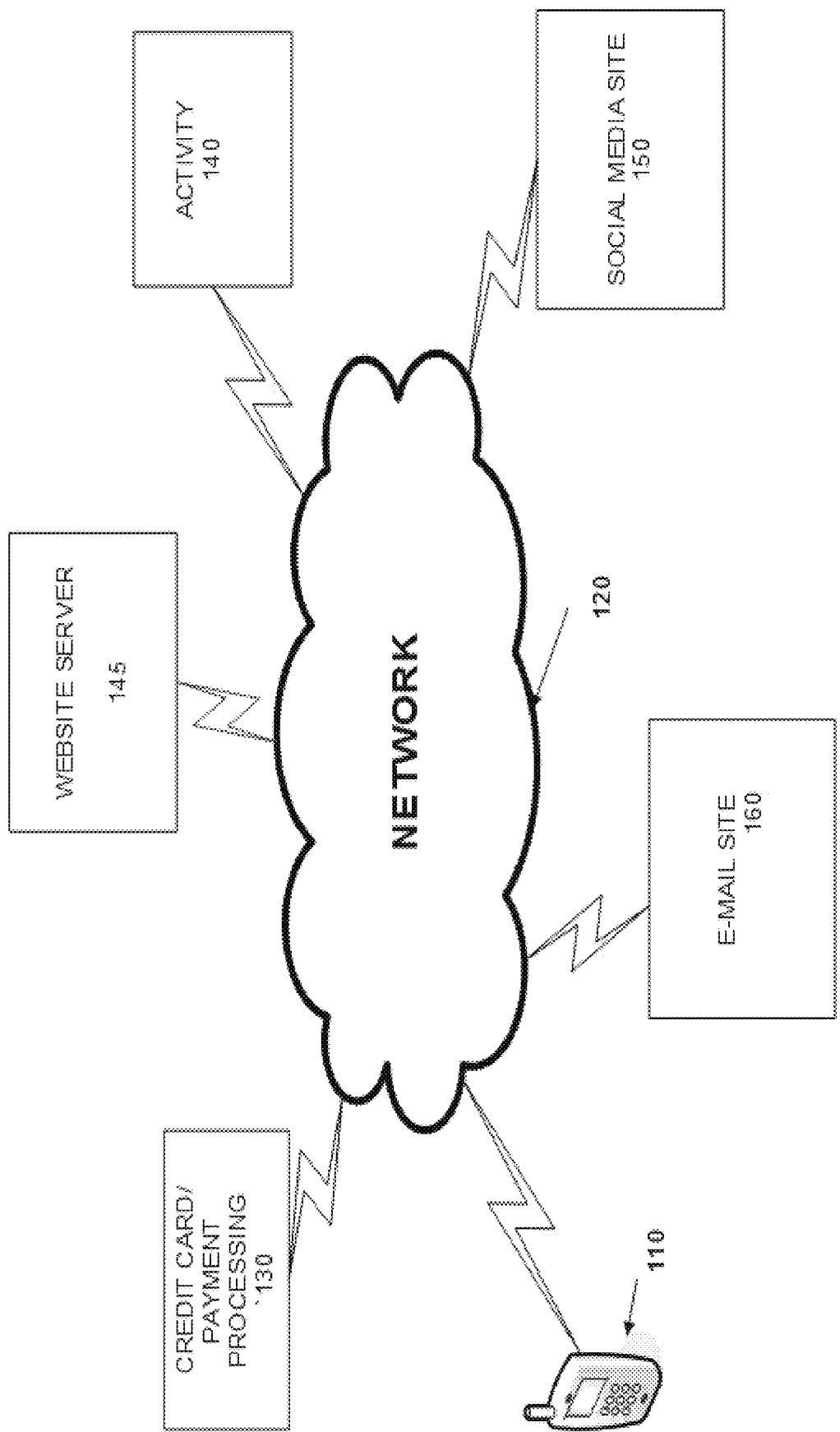
FIG. 19 is a schematic representation of one embodiment of the system of these teachings.

FIG. 19 is a schematic representation of one embodiment of the system of these teachings. Referring to FIG. 19, in the embodiment shown therein, a handheld mobile communication device 110, which can download applications, access web sites over the network and run applications, is connected through a network 120 to an exchange/payment processing site (component) 130, to one or more activity sites 140, to one or more social media sites 150, to a web site server 145 and to one or more email sites 160.

In one or more embodiments, the system of these teachings for providing a graphical activatable link (also referred to as a badge; for examples of uses of activatable link see, for example, U.S. Pat. No. 6,952,799, which is incorporated by reference herein in its entirety and for all purposes) related to an activity includes a handheld mobile communication device, an exchange/payment processing site configured to receive information from the handheld mobile communication device, an activity site configured to receive information from the handheld mobile communication device and the exchange/payment processing site and a social media site having a social media profile section corresponding to a person making a donation to the activity. The handheld portable communication device and the web site server have one or more processors, which are configured to select the activity from an activity list, the activity list being presented by an application in the handheld mobile communication device, make the donation to the activity using the handheld mobile communication device, verify that the donation has been made by communicating between the handheld mobile communication device and the exchange/payment processing site, provide, after verifying that the donation has been made, the graphical activatable link related to the activity to a profile section of the application corresponding to the person making the donation, and automatically post the graphical activatable link to at least one social media site corresponding to the person making the donation to the activity. The distribution of tasks between the handheld portable communication device and the activity site vary from an "app" received at and resident in the handheld portable communication device to accessing, from the handheld portable communication device, a website at the web site server. When the website is used, the user can receive text with a link and activating the link will connect the user to the website.

In one or more other embodiments, the system of these teachings for providing a graphical activatable link related to an activity includes a handheld mobile communication device, a web site server configured to receive information from the handheld mobile communication device. The handheld mobile communication device and the web site server have one or more processors; the one or more processors being configured to:

select an activity from an activity list, the activity list being presented in a graphical user interface by of the handheld mobile communication device; make the donation to the activity using in the handheld mobile communication device; wherein the exchange corresponding to the donation is a response to a challenge; the response to the challenge comprising providing a photo or providing a video;

verify that the donation has been made by communicating between the handheld mobile communication device and the web site server;

provide, after verifying that the donation has been made, the graphical activatable link related to the activity to a profile corresponding to the person making the donation; and provide, after verifying the donation has been made, access of the person making the donation to a community of users who have made donations to the activity.

The web site server is also configured to process an exchange corresponding to the donation. The distribution of tasks between the handheld portable communication device and the web site server vary from an "app" received at and resident in the handheld portable communication device to accessing, from the handheld portable communication device, a website at the web site server. When the website is used, the user can receive text with a link and activating the link will connect the user to the website.

In one or more embodiments, the method of these teachings for providing a graphical activatable link related to an activity includes selecting the activity from an activity list, the activity list being presented by an application in a handheld mobile communication device, making the donation to the activity using the handheld mobile communication device, verifying that the donation has been made by communicating between the handheld mobile communication device and an exchange/payment processing service, providing, after verifying that the donation has been made, the graphical activatable link related to the activity to a profile section of the application corresponding to the person making the donation, and automatically posting the graphical activatable link to at least one social media site corresponding to the person making the donation to the activity.

In one or more other embodiments, the method of these teachings for providing a graphical activatable link related to an activity includes selecting the activity from an activity list, the activity list being presented by an application in a handheld mobile communication device,
making a donation to the activity using the handheld mobile communication device, wherein an exchange corresponding to the donation is a response to a challenge, the response to the challenge comprising providing a photo or providing a video, and communicating between the handheld mobile communication device and a web site server in order to verify that the donation has been made.

Figure 1:
Figure 2:
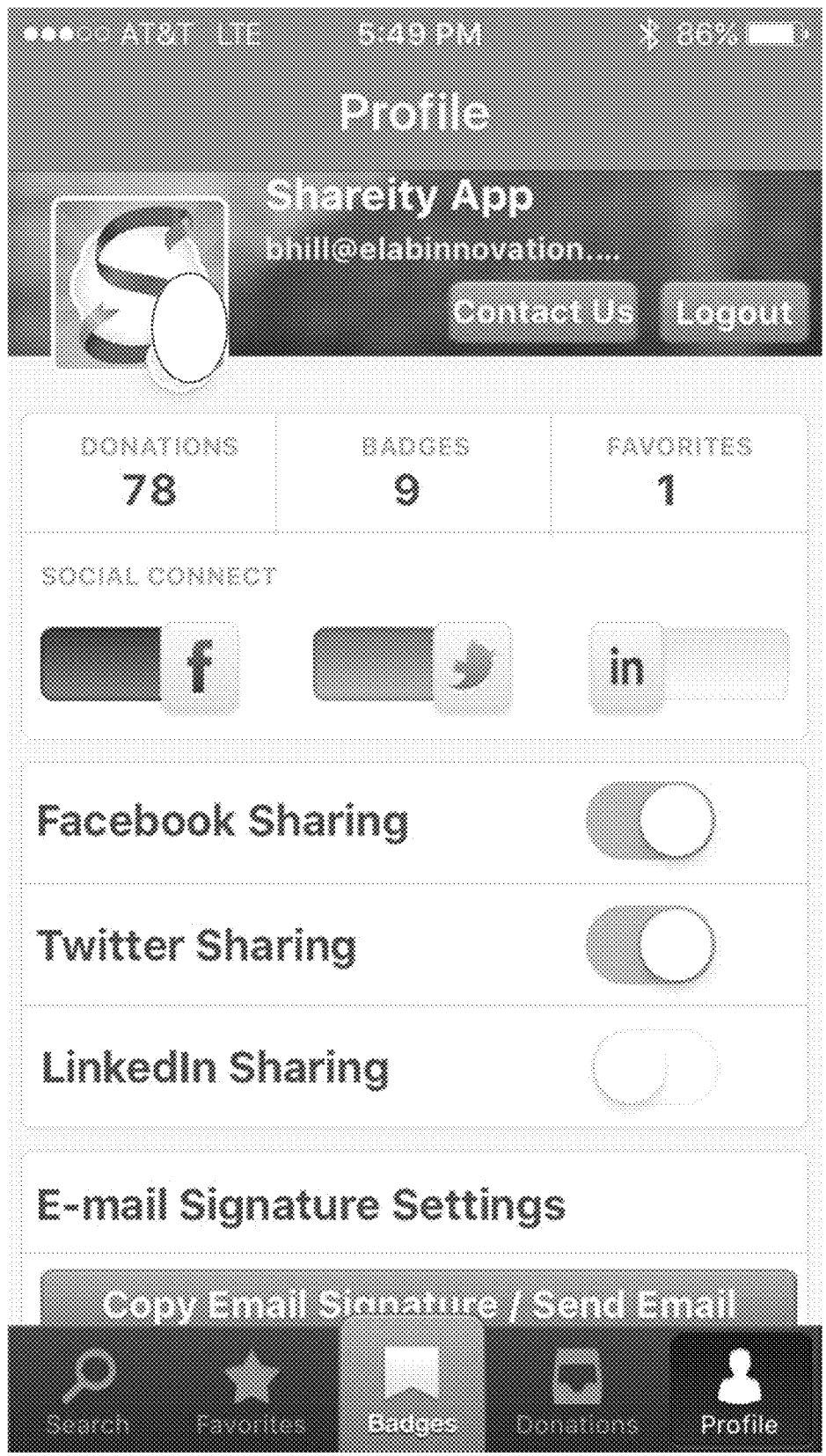
Figure 3:
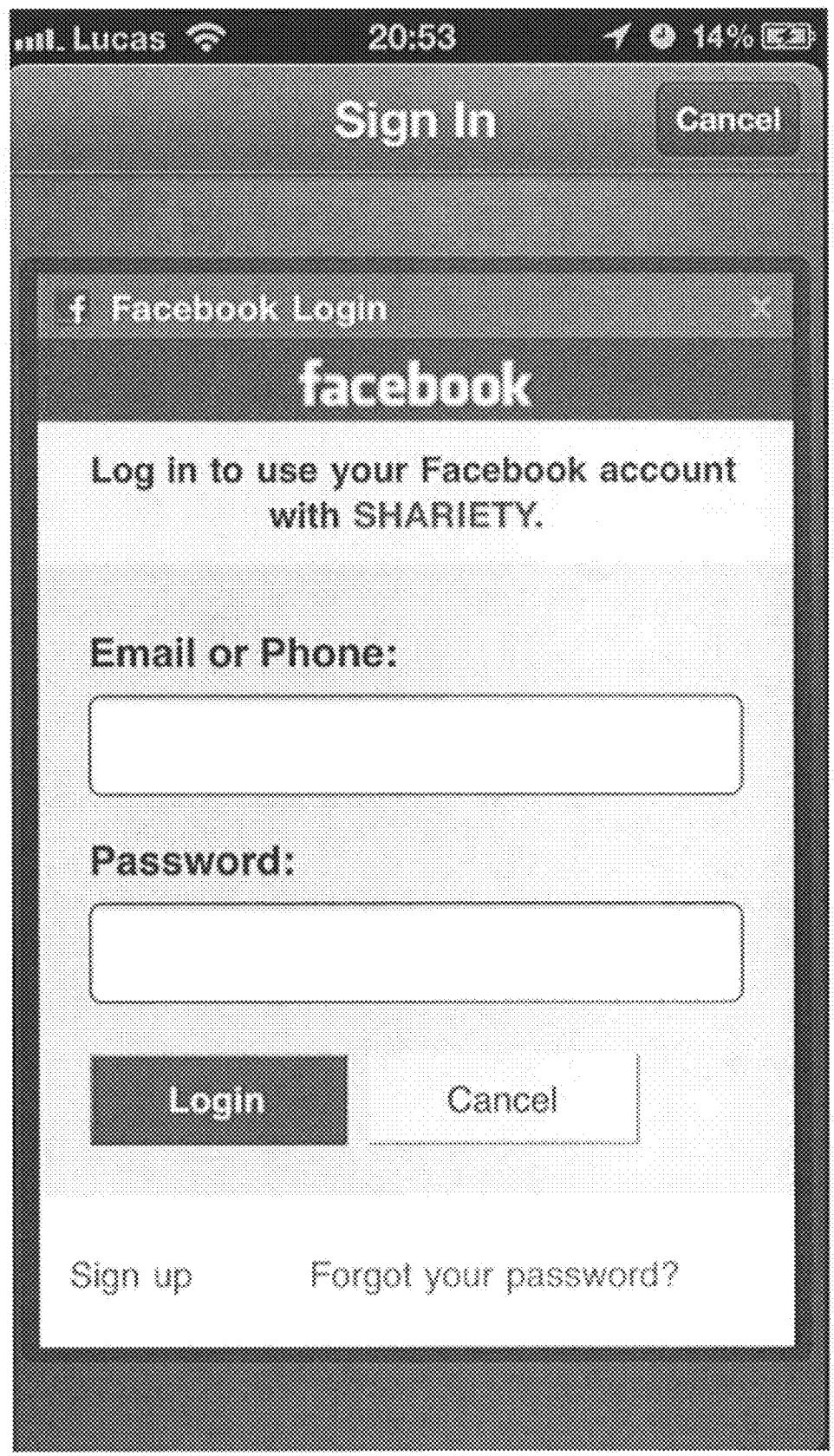
Figure 4:
Figure 5:
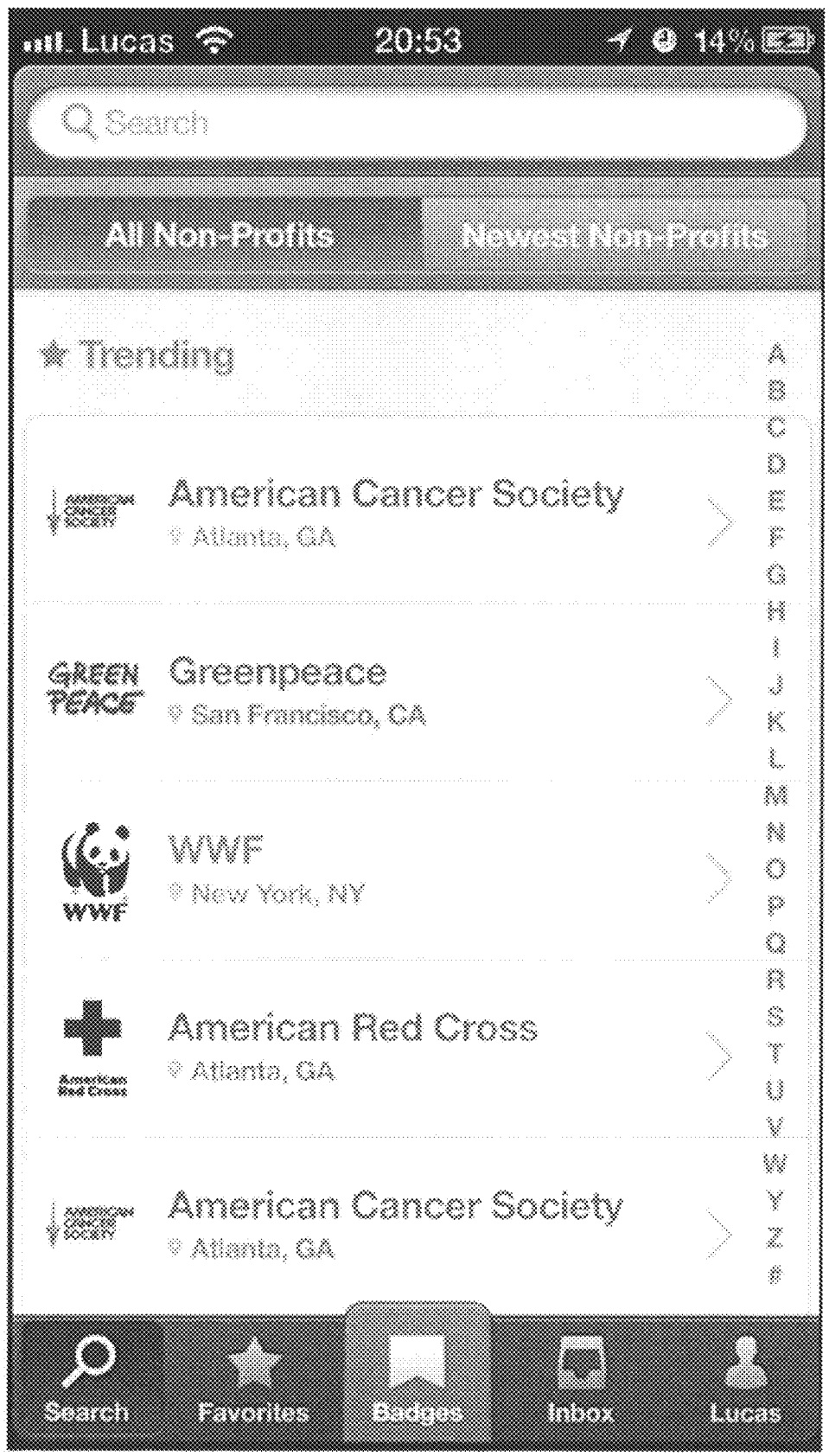
Figure 6:
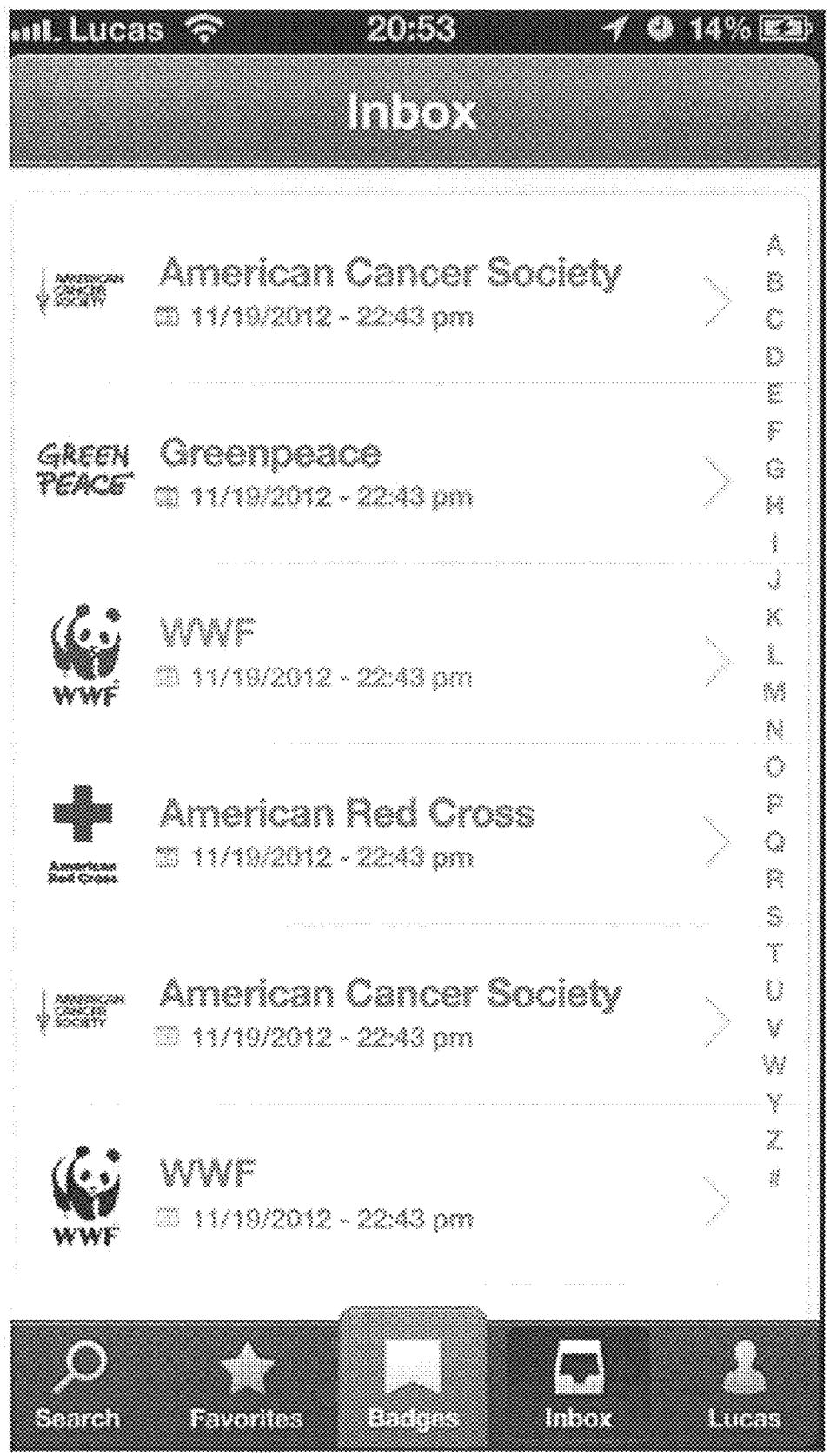
Figure 7:
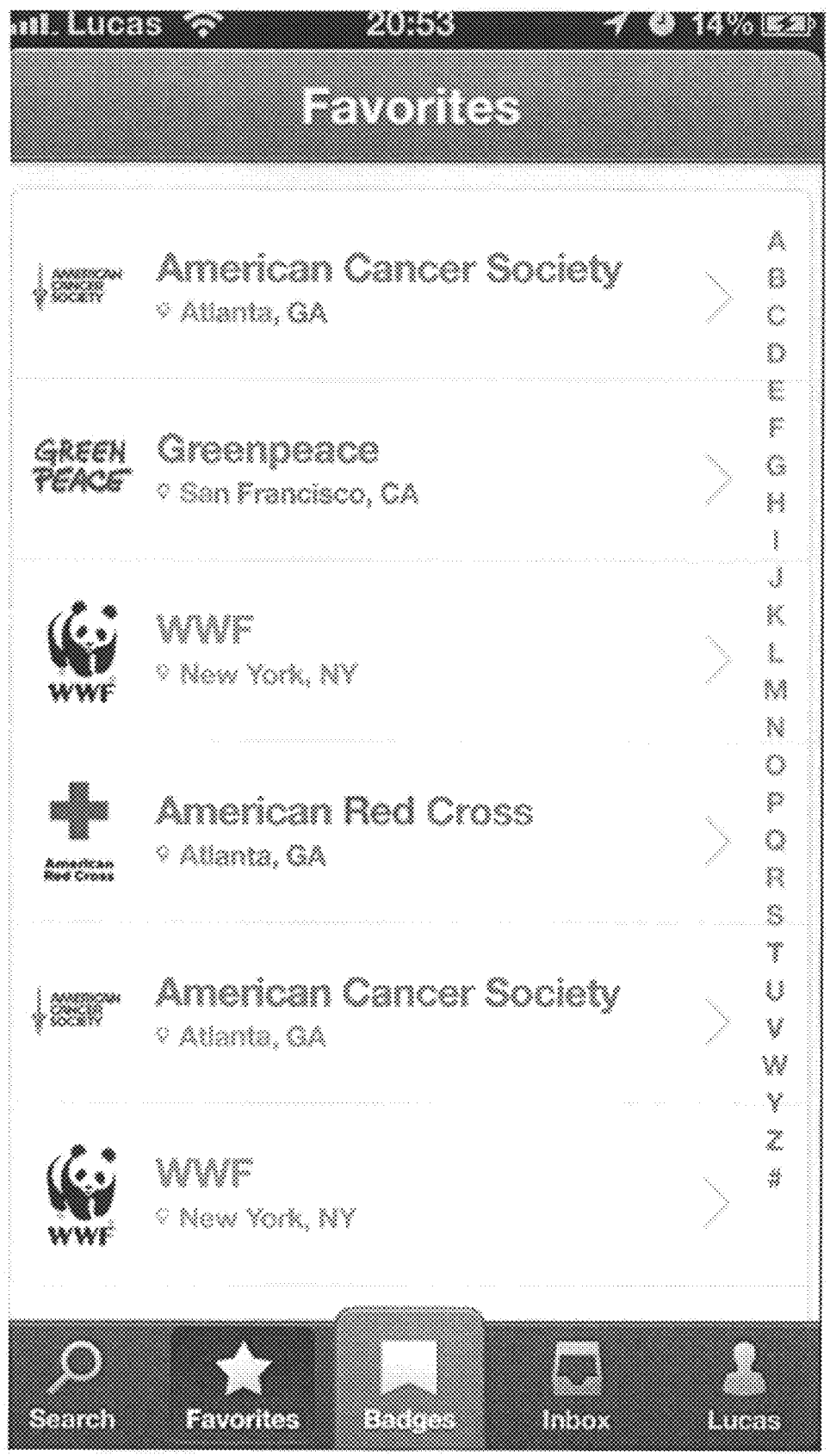
Figure 8:
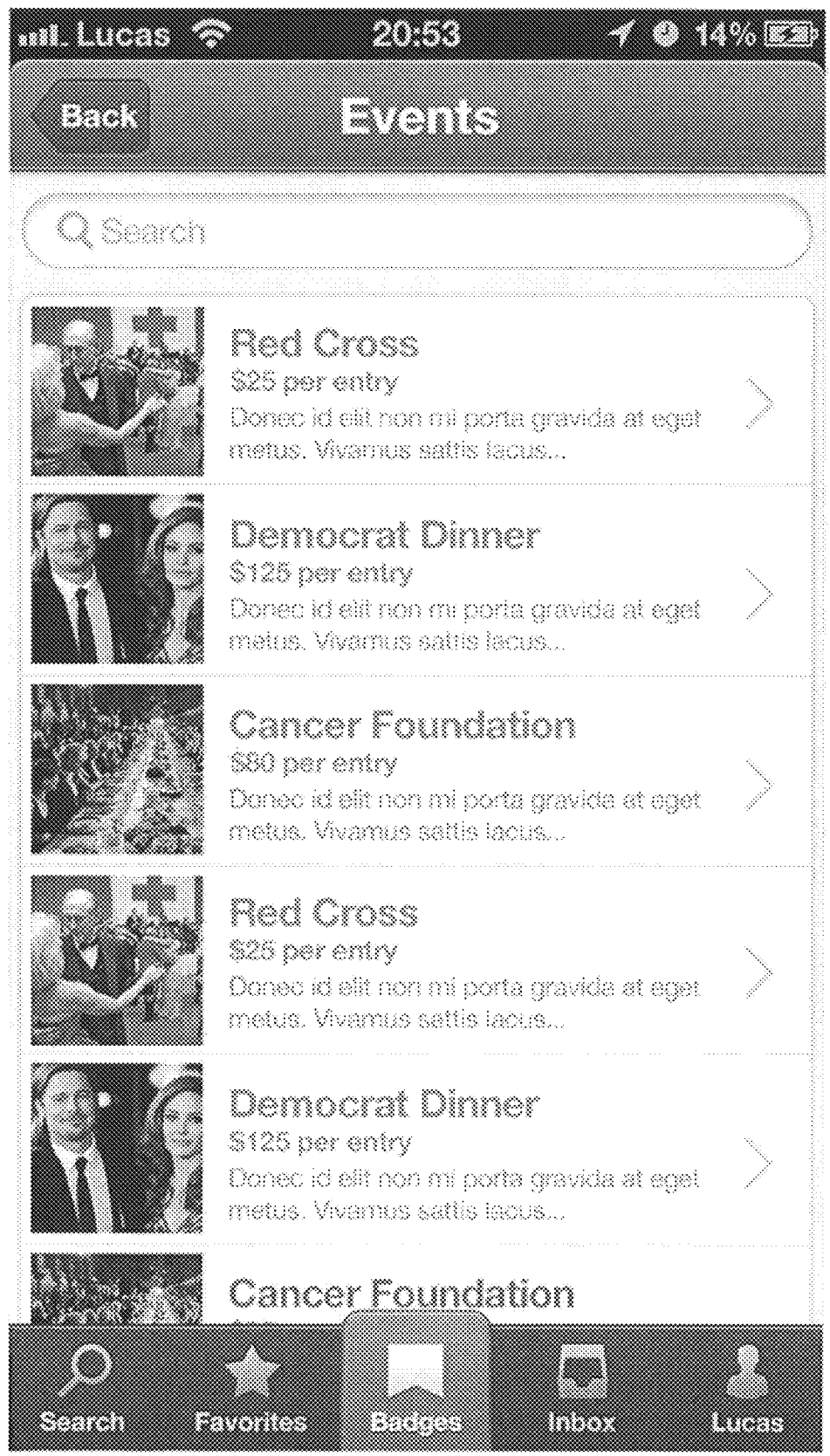
Figure 9:
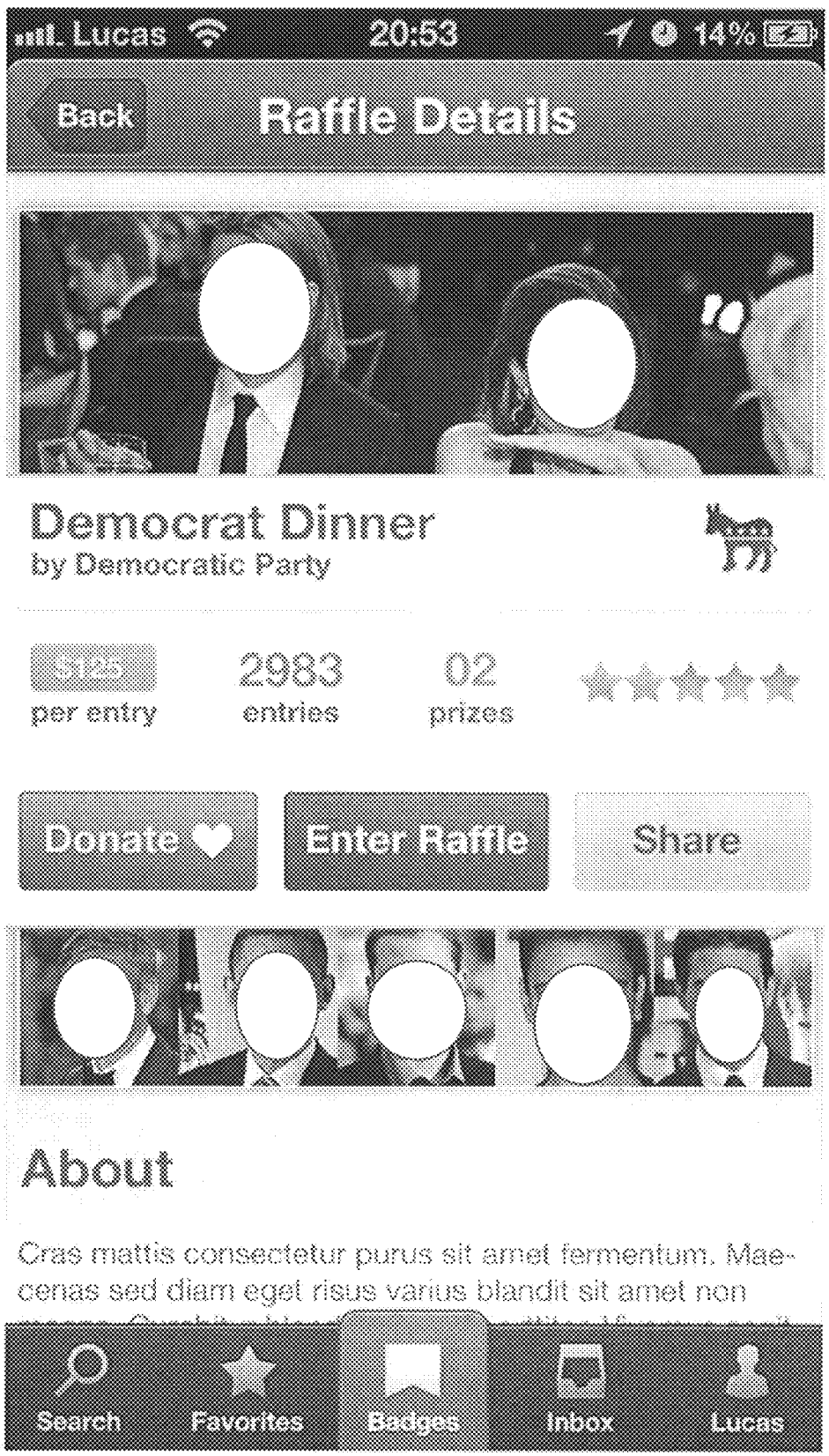
Figure 11:
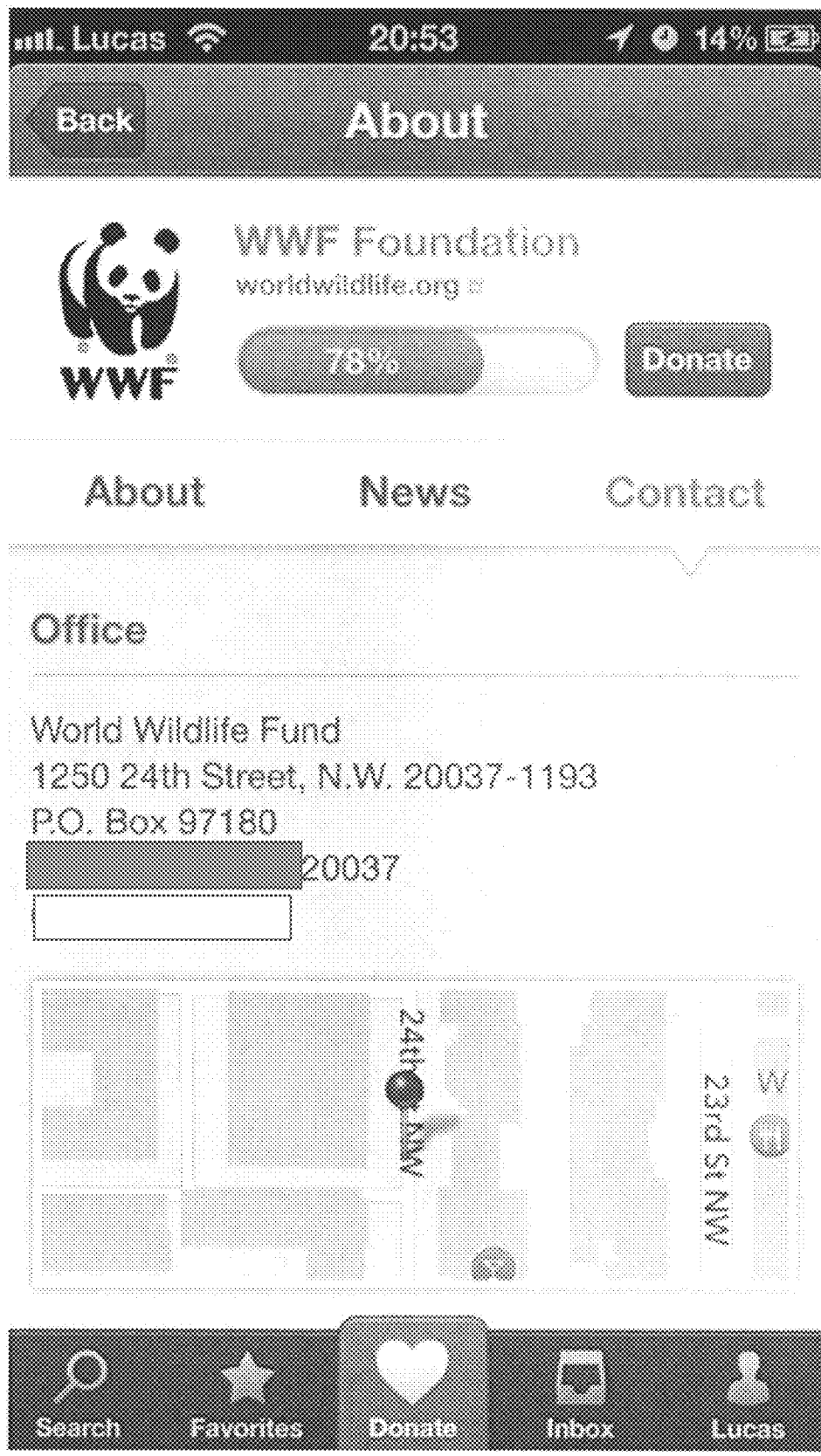
Figure 12:
Figure 13:
Figure 14:
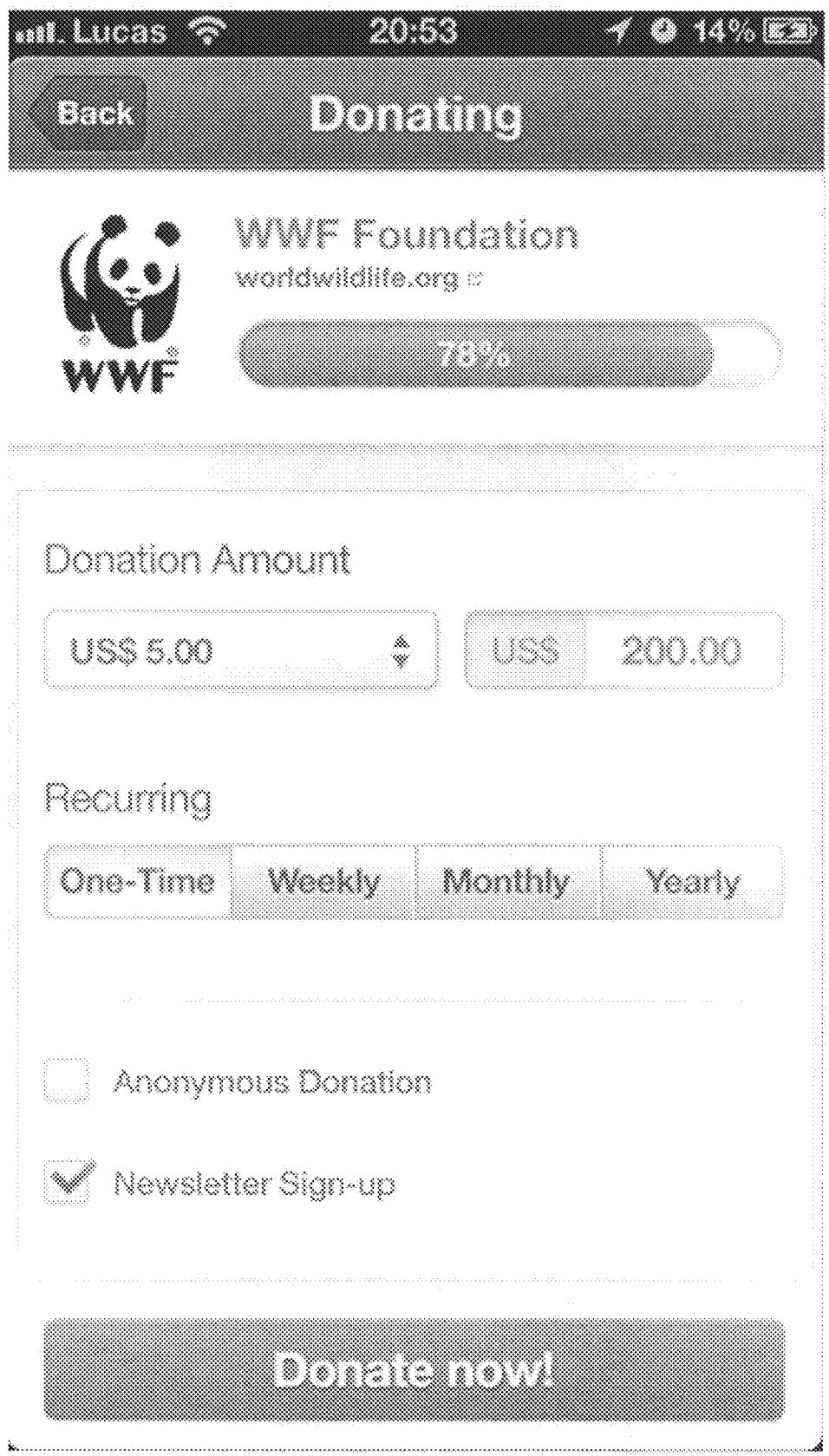
Figure 15:
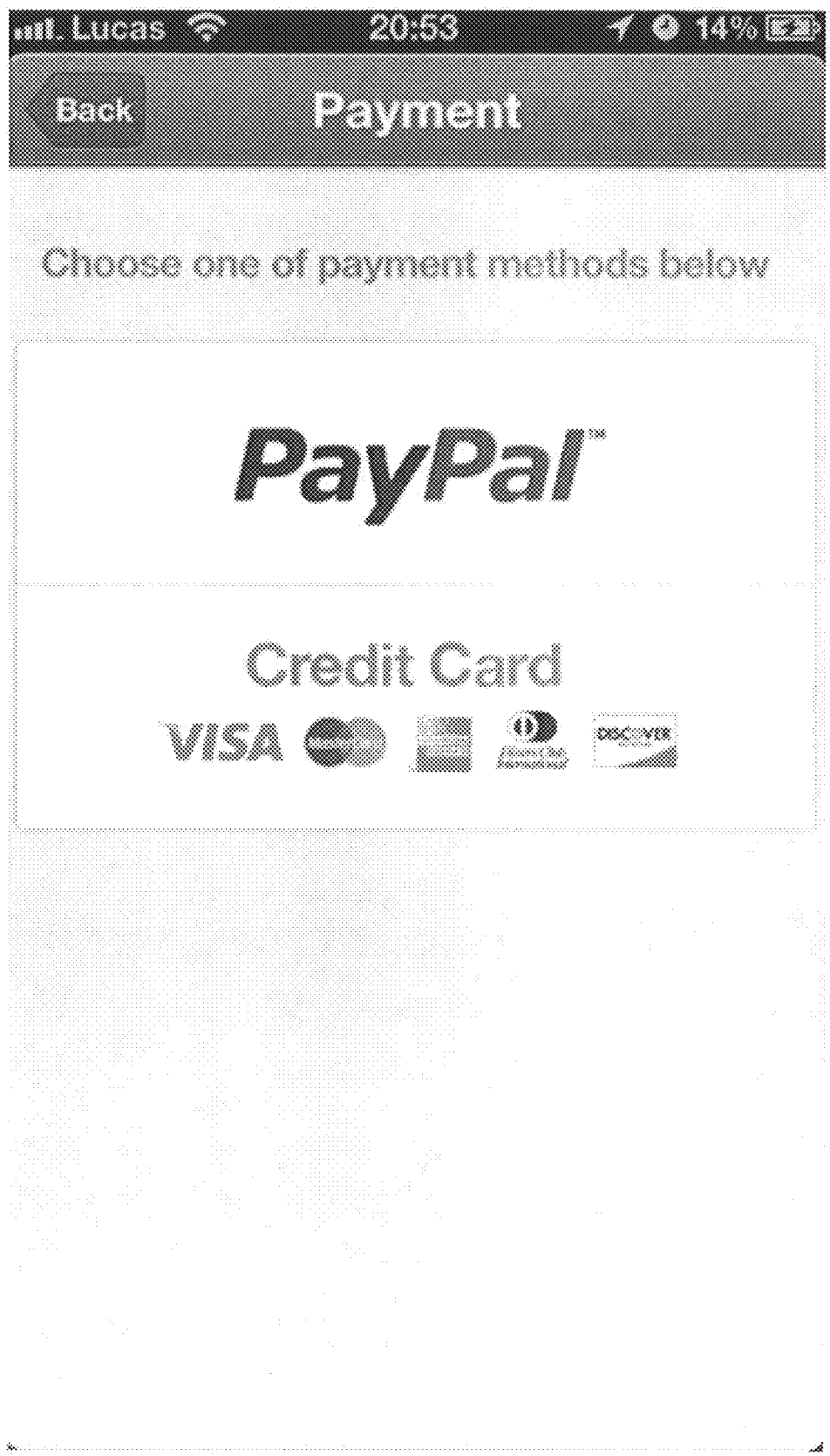
Figure 16:
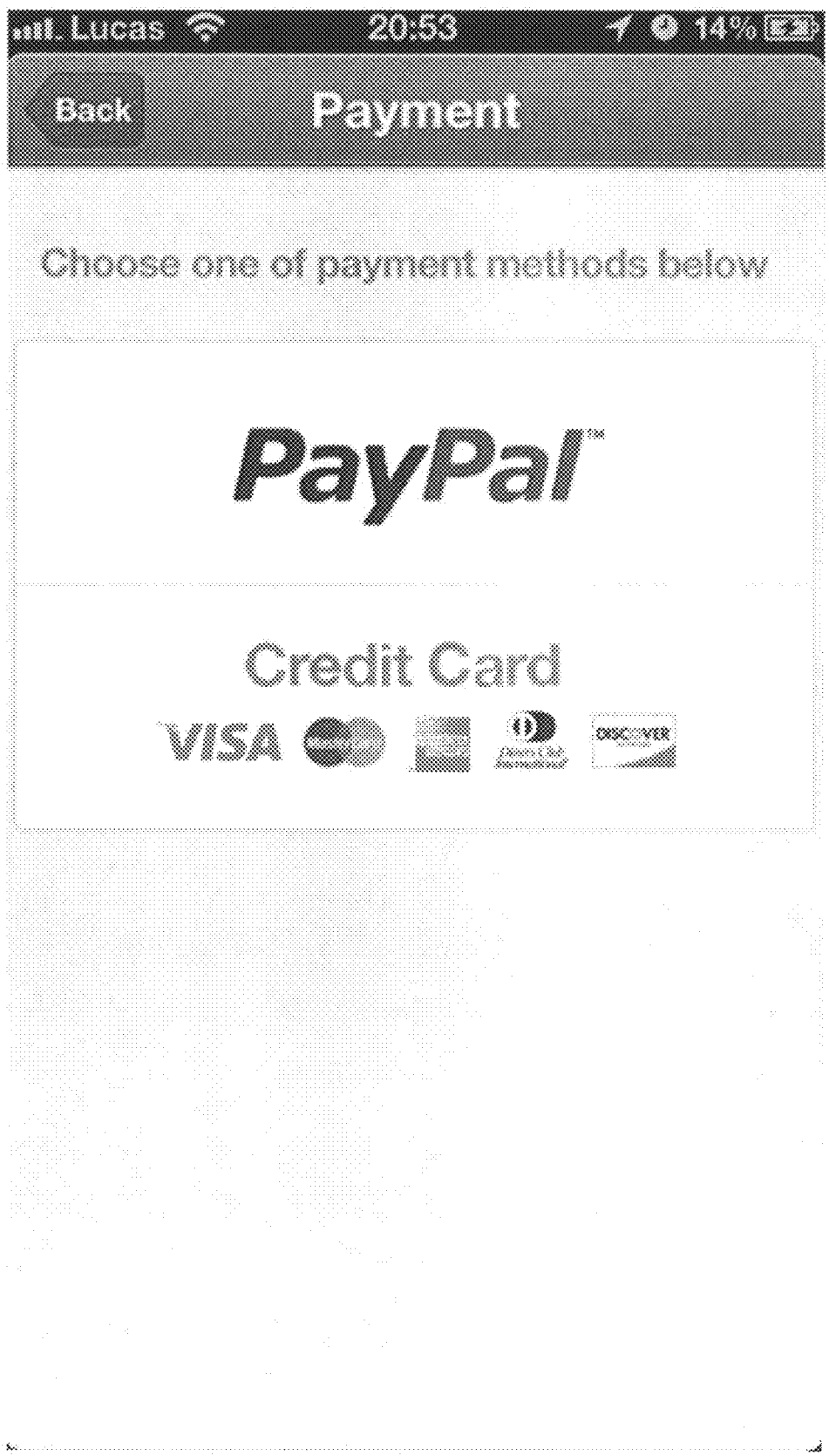
Figure 18B:
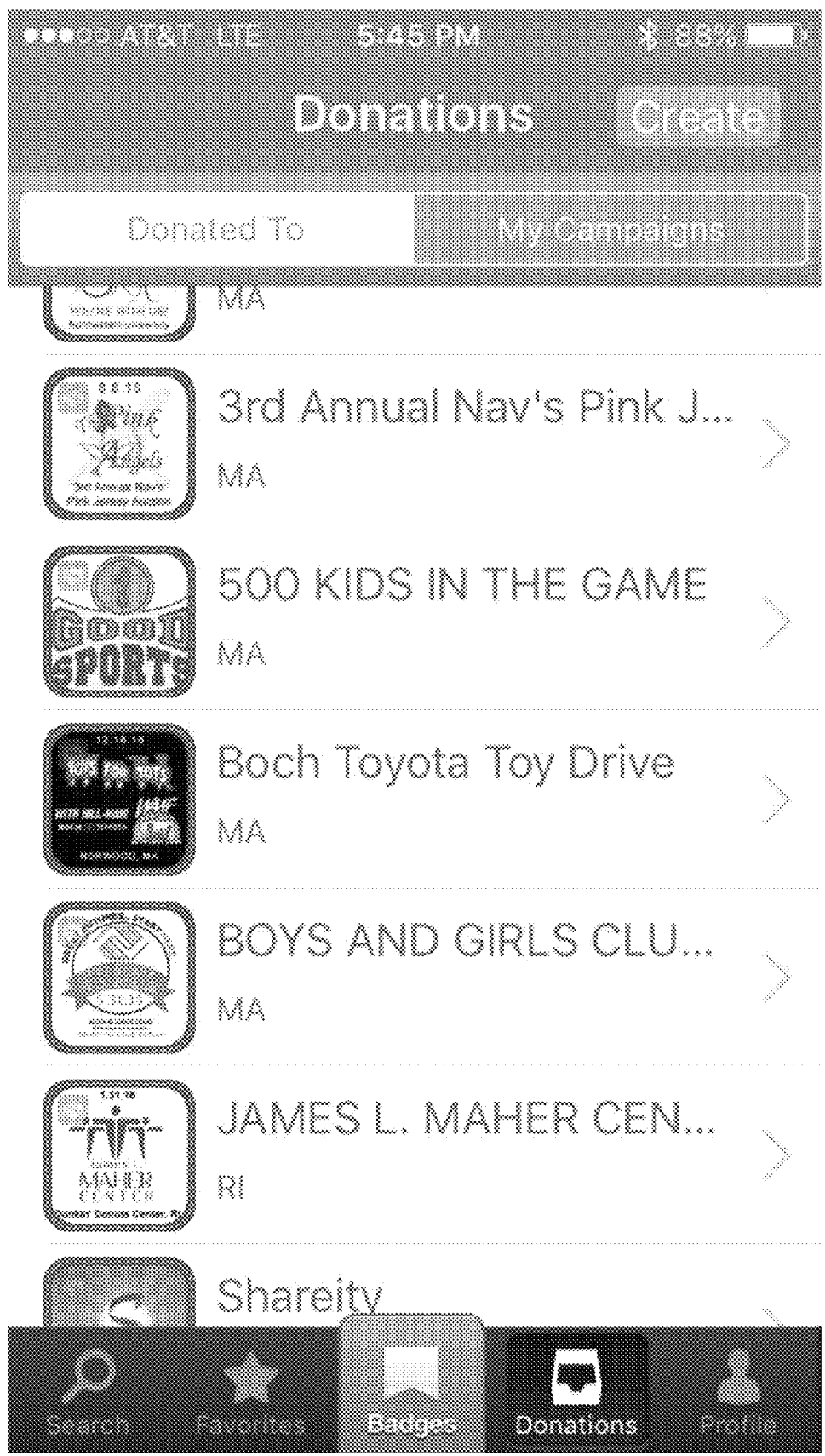

In order to further elucidate these teachings, an exemplary embodiment is described herein below. FIGS. 1-18*b* are graphical representations of screenshots of one embodiment of the system of these teachings. FIG. 1 depicts the screen shot from the screen produced after the application is activated (started running). The application shown in FIG. 1 is named Shariety. A user running the application starts by populating a profile, as shown in FIG. 2. The profile also gives a tally of the donations by the user, the "badges" obtained by the user and the favorite charities. FIGS. 3 and 4 show the user providing logging information for two social media sites, Facebook and Twitter in the example shown. FIG. 5 depicts a list of the charities, with only some of the charities shown. FIG. 6 shows selected charities. FIG. 7 shows favorite charities. FIG. 8 shows a list of activity events to which the user can donate and FIG. 9 shows details for one such event. (In one instance, the badge can be used in order to gain entrance into the event. In other words, the badge replaces a ticket.) FIG. 10 shows information about one activity which can be obtained by activating (such as clicking on) the activity name or symbol. Included in the information for the activity is the percentage of the donations that are used for the purpose of the activity. The information is divided into information about the activity, news about the activity and contact information for the activity. The topics are accessible by activating the word in the banner. FIG. 11 shows the contact information for the activity. FIG. 12 shows the news about the activity. If the user decides to donate to the activity, the user then activates the donate button in the screen providing information about the activity. Upon activation of the donate button, the user is presented in new screen that the user can use to select the amount of the donation. Upon selection of the amount, a summary of the donation is presented to the user for review, as shown in FIG. 14. To complete the donation the user activates the Donate now button. The user is then provided with available payment services, for example, PayPal™ or credit card services, as shown in FIG. 15. (Although a donation is depicted as involving a monetary exchange, it should be noted that other donations are within the scope of these teachings.) FIG. 16 shows the required credit card information is the user is using credit card services. Upon verification by the payment service, the donation was made to the activity and a thank you screen is provided to the user, as shown in FIG. 17. Upon verification by the payment service, a graphical activatable link (also referred to as a badge) is placed on the user "wall" area of the application, as shown in FIG. 18. FIG. 18*b* shows a record list of all the donations that the user has made.

Once the badge is placed on the user wall area, the application automatically posts the badge to the user's social media sites. Automatic posting is performed, in one embodiment, using the software development kit (SDK) of the social media site or the application programming interface (API) for the social media site in developing the automatic posting instructions. In some instances, a PHP SDK is used or a PHP library is used in automatic posting.

Many social media sites have a time limit for the time a posting is kept available. Using the timing component in the one or more processors, the automatic posting component keeps track of the time over which the posting has been available and, when the time exceeds the time limit, reposts the badge. The automatic posting component also keeps track of the total time over which the badge has been posted and, if the total time exceeds a predetermined time, the application removes the badge from the wall and removes the posting.

Automatic posting has a significant value to the activity donation. Most users have very little extra time (see, for example, Steffan Burenstam Linder, The Harried Leisure Class). Posting to social media, if made the responsibility of the user, may not happen and reposting is even less likely. Keep in the posting active in the social media is important to the donation program since it is a way to propagate the donation. Once the badge is posted, the posting is presented to the social media network of the user. Since the badge is a graphical activatable link, the members of the social network of the user can obtain more information about the activity and about the application. The link can provide access to the application that provides the badges and to the activity. It is possible for the donation to go viral. This is ensured and enabled by the automatic posting.

The application can also place the badge in the signature section of the user profile in an email program. The application place at the badge in the signature section by copying the badge, accessing the signatures section and after the last line in the signature copying the badge to the signature section for the user. FIG. 18*a* shows an e-mail with the badges posted after the last line in the signature.

In one embodiment, the number of accesses to the badge (activatable graphical link) is counted. The number of accesses can be related to the number of referrals. The counting of the number of factors can be performed, in one instance, at the activity site, or, in another instance, at the application running in the handheld mobile communication device. The badge can be updated or a new batch provided for a large number of referrals or for a specified number of referrals.

Figure 20:
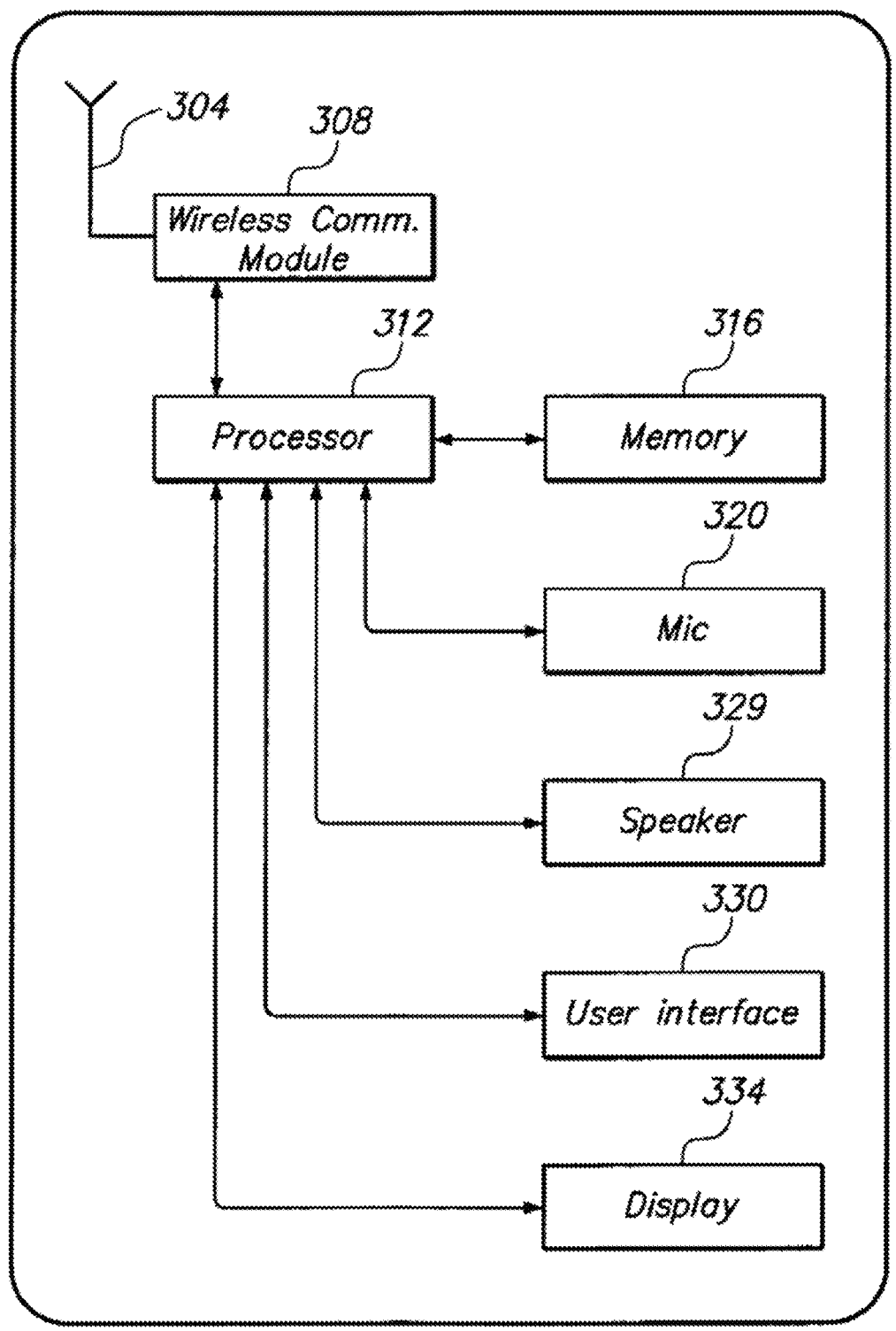
FIG. 20 represents a handheld mobile device as used in one embodiment of these teachings.

FIG. 20 shows one embodiment of the handheld mobile communication device used in these teachings. In the embodiment shown in FIG. 20, the handheld mobile communication device has an antenna 304 operatively connected to a wireless communication module 308. The wireless communication module 308 is operatively connected to one or more processors 312. A user interface 330 and a display 334 are operatively connected to the one or more processors 312. A memory 316, which has computer readable code embodied therein, is also operatively connected to the one or more processors 312. The computer readable code, when executed by the one or more processors 312, causes the one or more processors 312 to display an icon for the application in the user interface 330 and, when the icon is activated, execute the application. The handheld mobile communication device, in the embodiment shown in FIG. 20, also has a microphone 320 and a speaker 329 operatively connected to the one or more processors 312.

It should be noted that "donation" is used in a broad sense. In one instance, an exchange corresponding to the donation is a monetary exchange and the exchange/payment processing component is configured to use a merchant service. In another instance, an exchange corresponding to the donation is a response to a challenge and the exchange/payment processing component is configured to ascertain that the response to the challenge has been performed.

Figure 41:
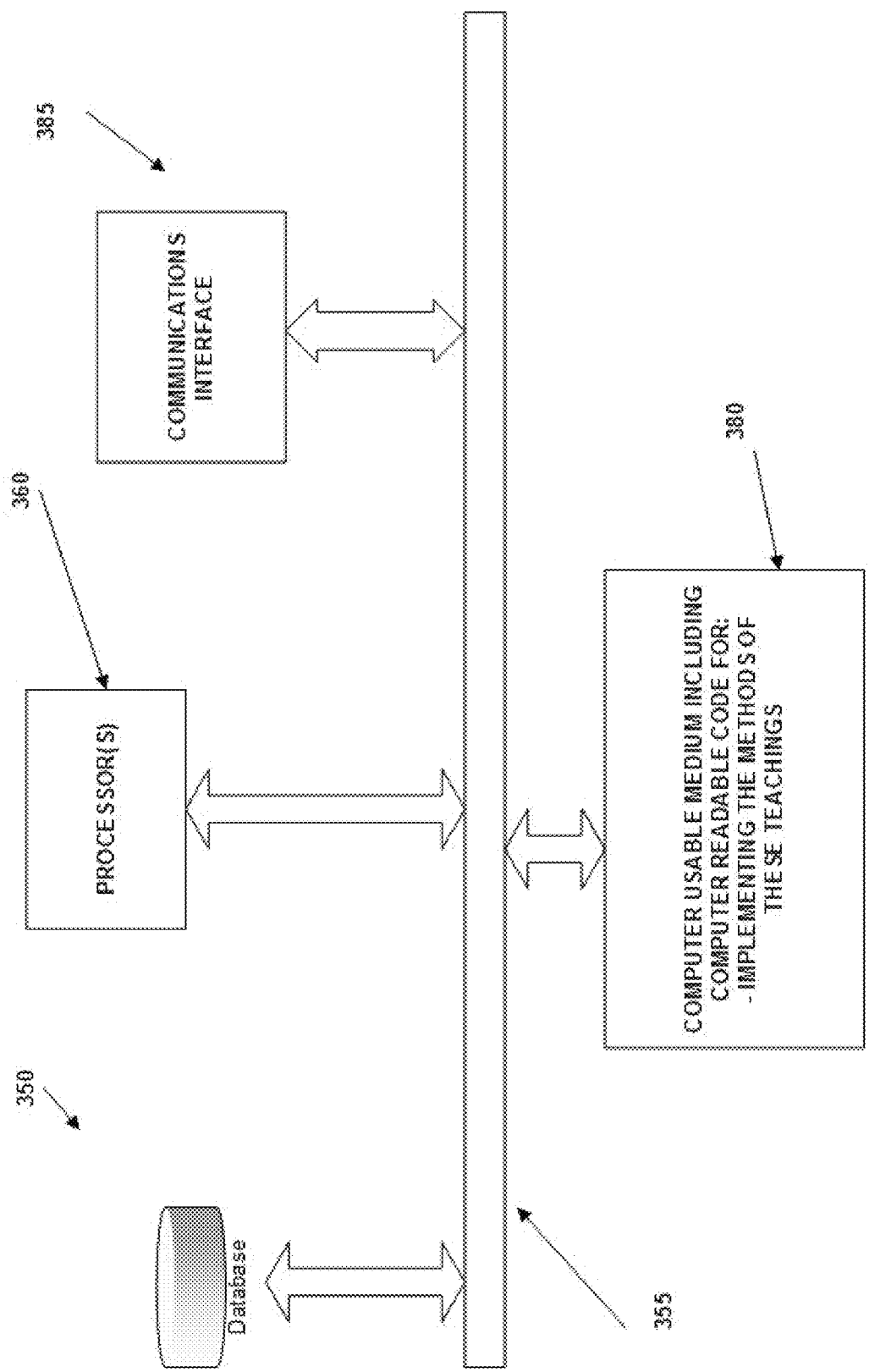
FIG. 41 is a schematic representation of one embodiment of the web site server of these teachings.

In one embodiment, the web site server 145 of these teachings includes one or more processors (360, FIG. 41), one or more communication devices for communicating over a network (385, FIG. 41), one or more computer usable media having computer readable code embodied therein causing the one or more processors to perform the method of the present teachings (380, FIG. 41). In one instance, the server also includes another computer usable medium having the database 350 described hereinabove embodied therein. The one or more processors 360, the one or more communication devices 385, the one or more computer usable media 380 and the database 350 are operatively connected by a computer connection component 355. One embodiment of the general structure of the web site server 145 is shown in FIG. 41.

Figures 21, 22, 23:
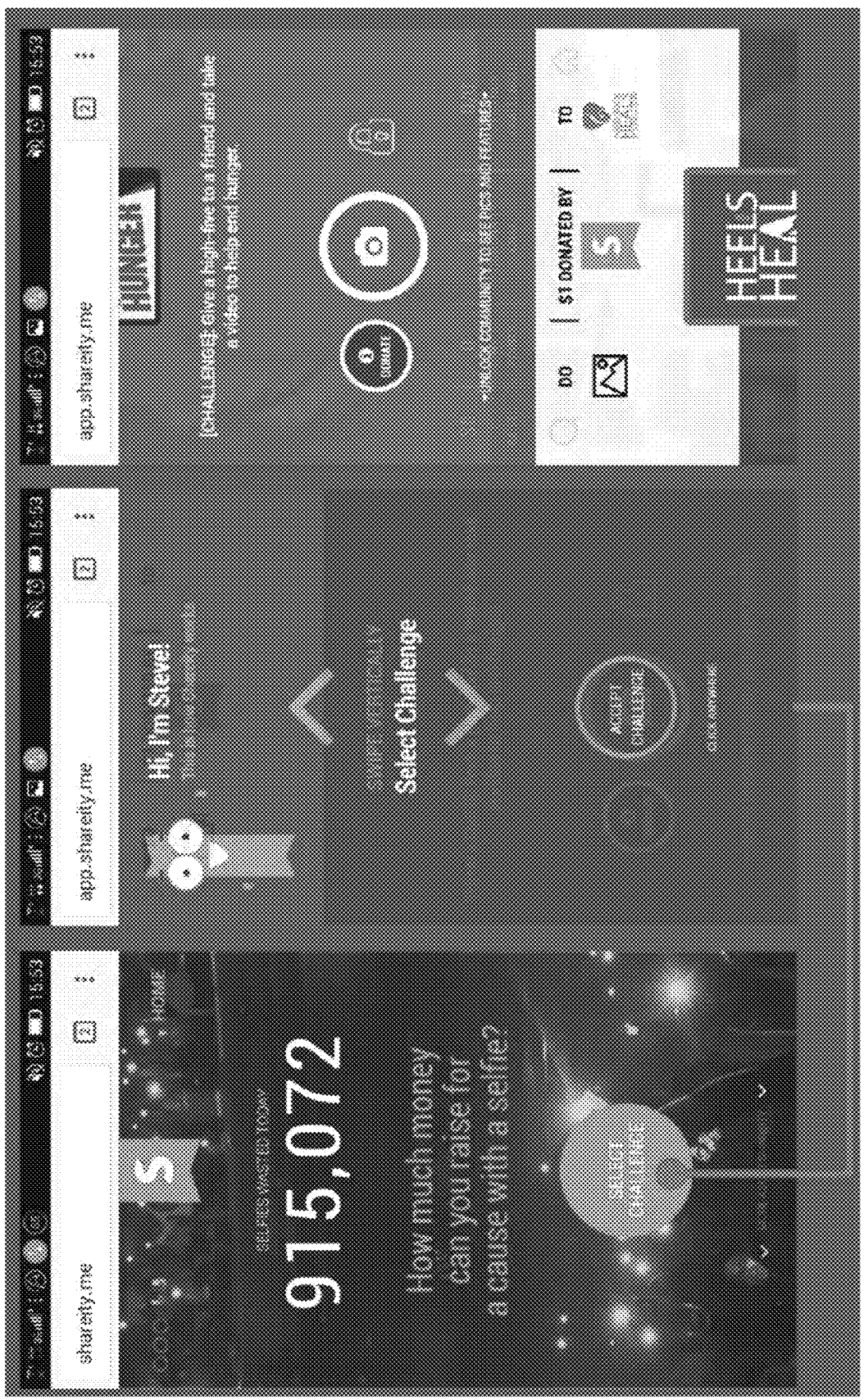
Figures 24, 25, 26:
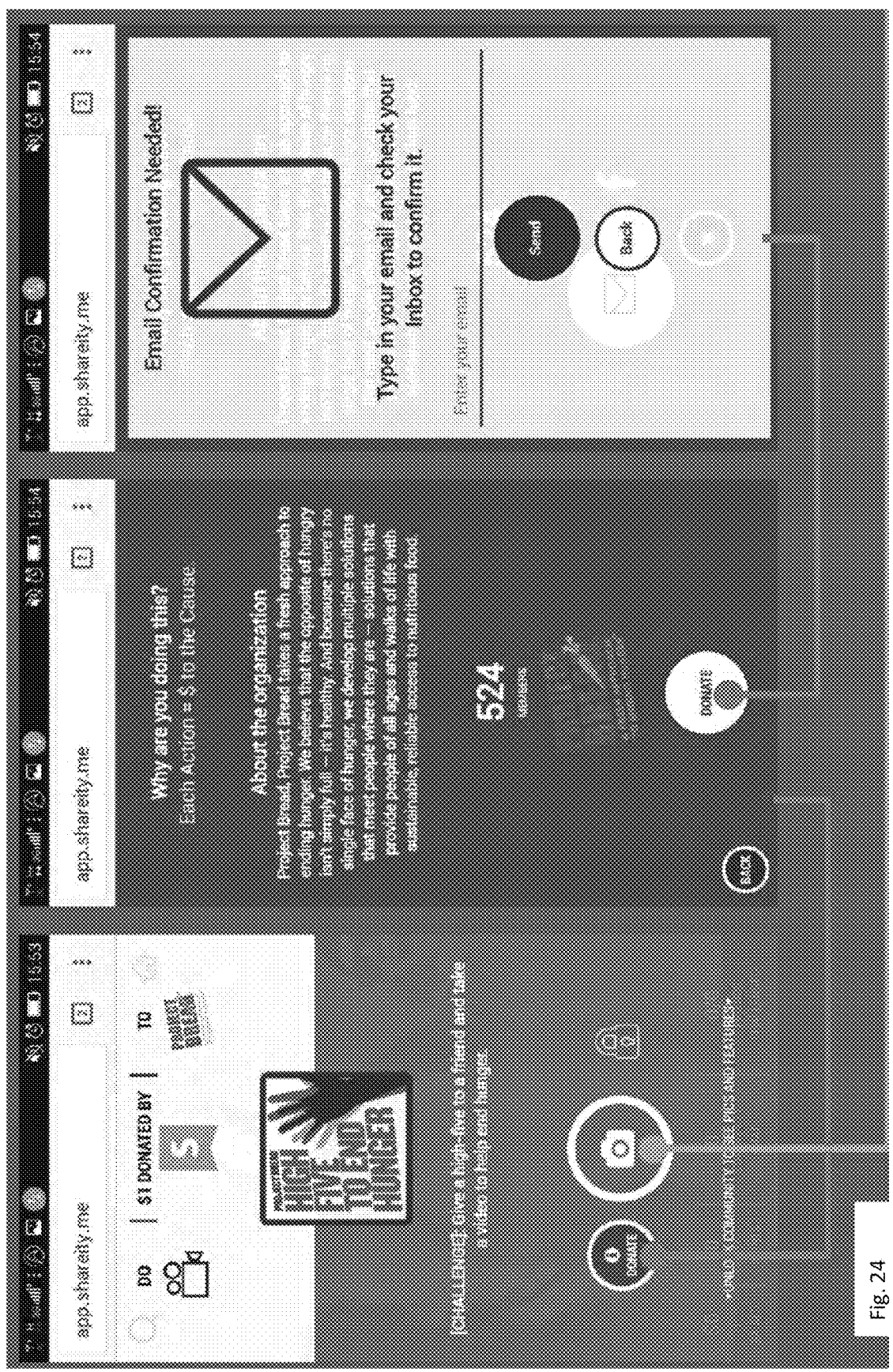
Figure 35:
Figure 36:
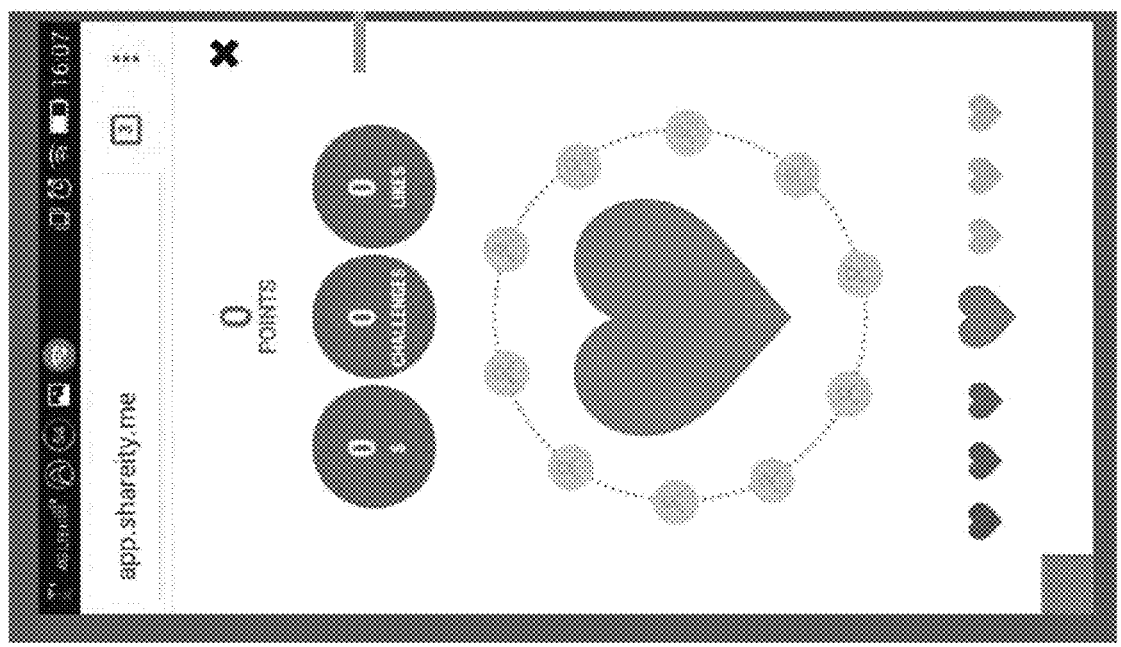

FIGS. 21-34 are graphical representations of screenshots of another embodiment of these teachings. FIG. 21 shows the screenshot received from a website and allowing a user to select a challenge. FIG. 22 shows another screenshot received from the website and allowing the user to select a challenge. FIG. 23 shows a screenshot depicting one challenge. FIG. 24 shows another screenshot depicting the one challenge. In the embodiments shown in FIGS. 23 and 24, a monetary donation is provided by another entity when the user completes the challenge, the challenge including a photo or video. When the user takes the picture or video required for the challenge and submits the picture or video by activating the "button," upon verification that the activity site, the challenge is completed. FIG. 25 shows a description of the entity receiving the donation. FIG. 26 shows a screenshot informing that email confirmation is needed. FIG. 27 shows a screenshot received after completing the challenge. In the embodiment shown in FIG. 27, the user can invite others to take the challenge. After completing the challenge, the user is admitted to a social media community related to the challenge (the community is unlocked to the user). In one embodiment, upon completion of the challenge, the user receives an announcement from the other entity that is providing the monetary donation. If the user is performing the tasks in a mobile device, the announcement can be provided during a setup time, as described in US patent publication US20160098758A1, which is incorporated by reference herein in its entirety and for all purposes. FIG. 28 shows another screenshot reminding the user to invite others to take the challenge. FIG. 29 shows a screenshot depicting the badge earned by the user, detailing the points earned and inviting the user to discover the social media community related to the challenge. FIG. 30 shows a screenshot depicting the unlocked community of people who have performed the challenge. FIG. 31 shows a screenshot depicting the state (dollars raised, points obtained, and friends that have performed the challenge) of the user in the community. By activating the "button" in the lower ribbon in FIG. 31 the user can get information on the points, as shown in FIG. 32 or the user can get information on friends who have performed the challenge, as shown in FIG. 33. (The word "button" is used herein in the same manner as it is used in relation to graphical user interfaces, see, for example, Petzold, Programming Windows, Fifth Edition. Chapter 9, Child Window Controls, which is incorporated by reference here in in its entirety and for all purposes.) By activating the "button" labeled "lightbeat," the user can obtain an animation which has a beating lighted figure, as shown in FIG. 34 and FIG. 35. The lightbeat can be used at events to unify users who are donating and to entice other users to donate. FIG. 36 shows another screenshot depicting the state (dollars raised, points obtained, and friends that have performed the challenge) of the user.

Figure 37:
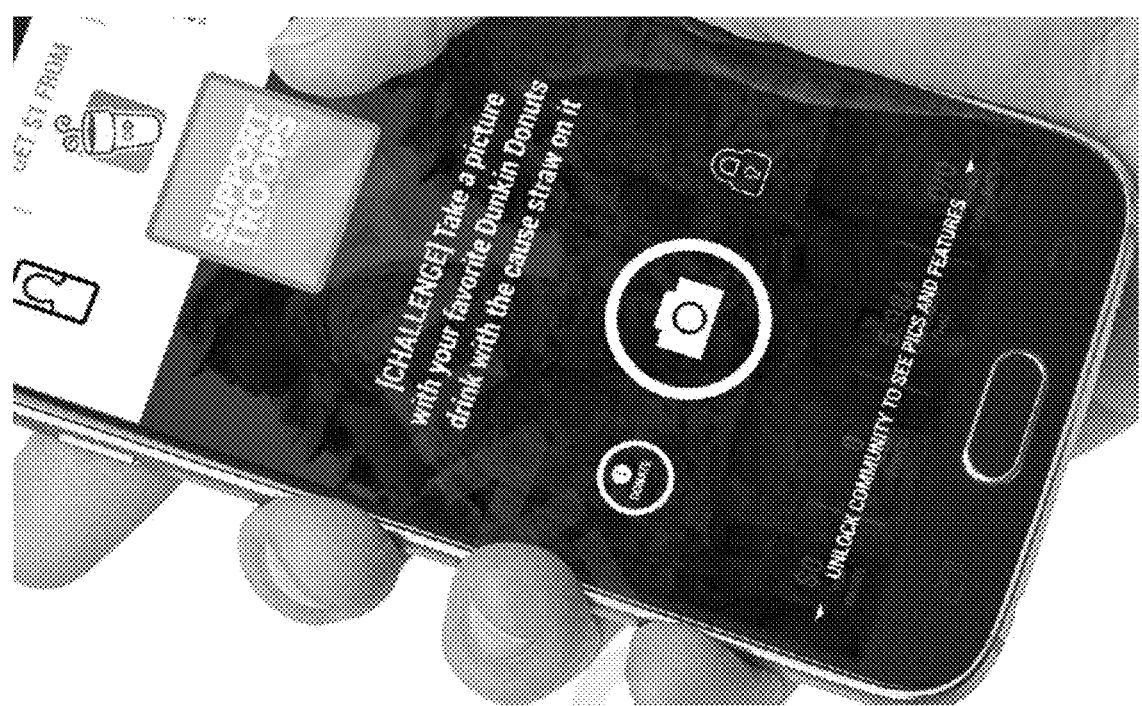
FIGS. 37-40 are graphical representations of exemplary embodiments of a challenge.
Figure 38:
Figure 39:
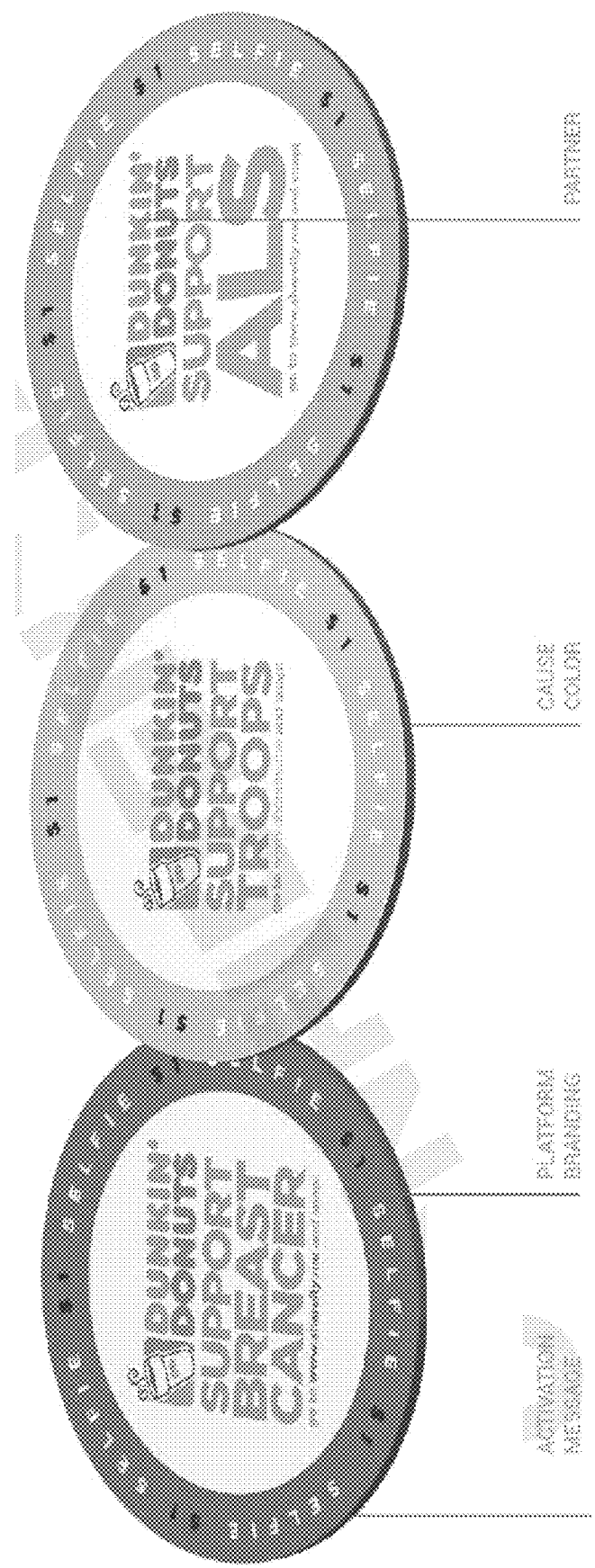
Figure 40:
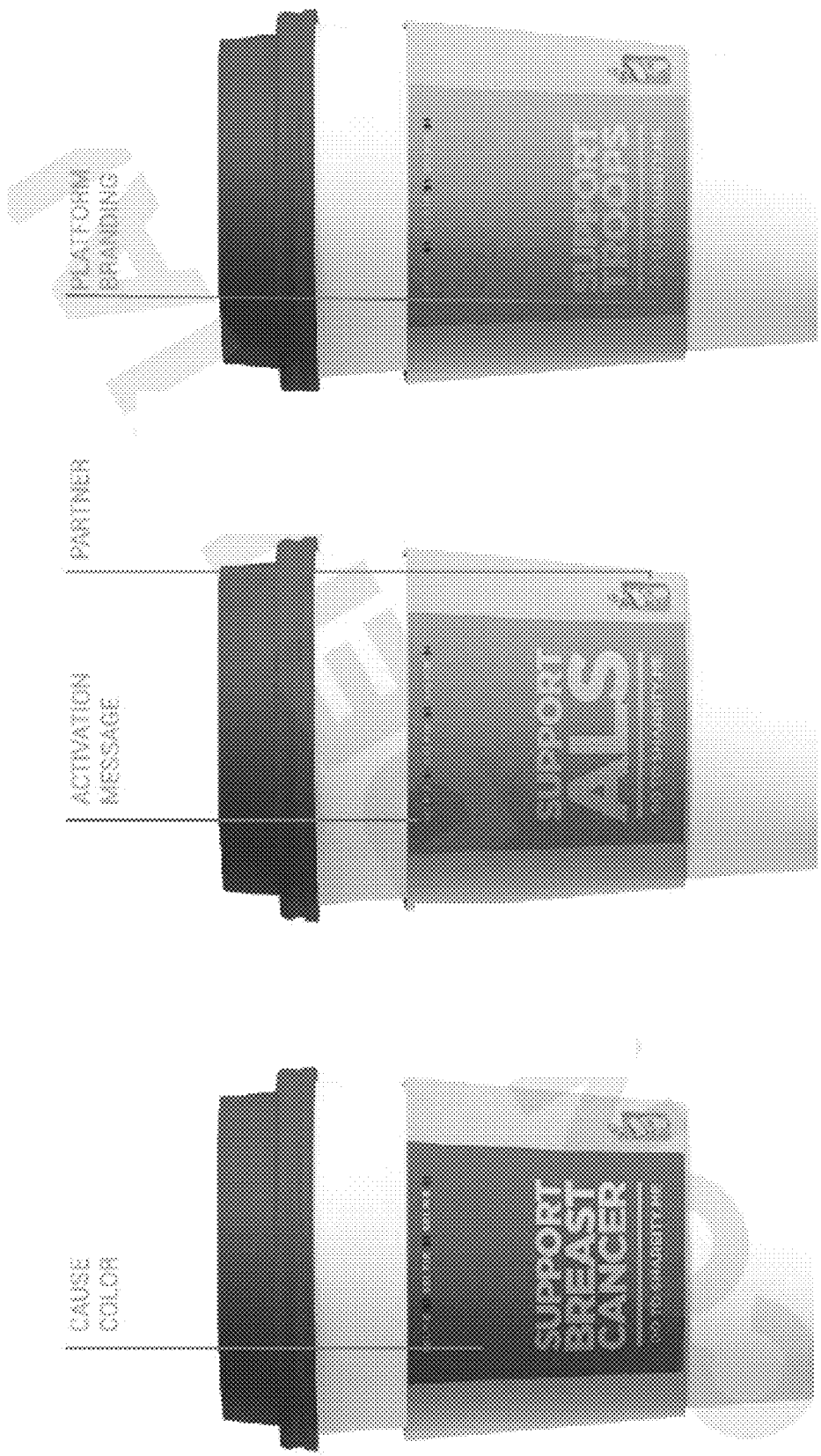

FIG. 37 shows an exemplary embodiment of a challenge. In the embodiment shown in FIG. 37, the challenge is to take a picture with a drink from the sponsor, the drink having a straw inserted in of a color indicative of the cause being supported (see FIG. 38). In other embodiments the drink is positioned on a coaster indicative of the cause being supported, as shown in FIG. 39. In yet another embodiment, the drink has a sleeve indicative of the cause being supported, as shown in FIG. 40. In this three exemplary embodiments, the sponsor contributes to the cause after the challenge is met.

In one or more further embodiments, the method of these teachings includes communicating between a handheld mobile communication device and a web site server, receiving, at the handheld mobile communication device, a screen (webpage) from the website server; the screen, including a "button," which, when activated (clicked on) sends, from the server to the handheld mobile communication device, a lighted screen. The lighted screen could be animation (light beat). The website server can keep track of the number of activations of the light beat button. If arranged as a challenge, a third party donates a predetermined amount for every activation of the button or for every activation of the button over a predetermined number of activations.

Figure 42:
FIGS. 42-51 are graphical representations of yet another embodiment of the system of these teachings.
Figure 42A:
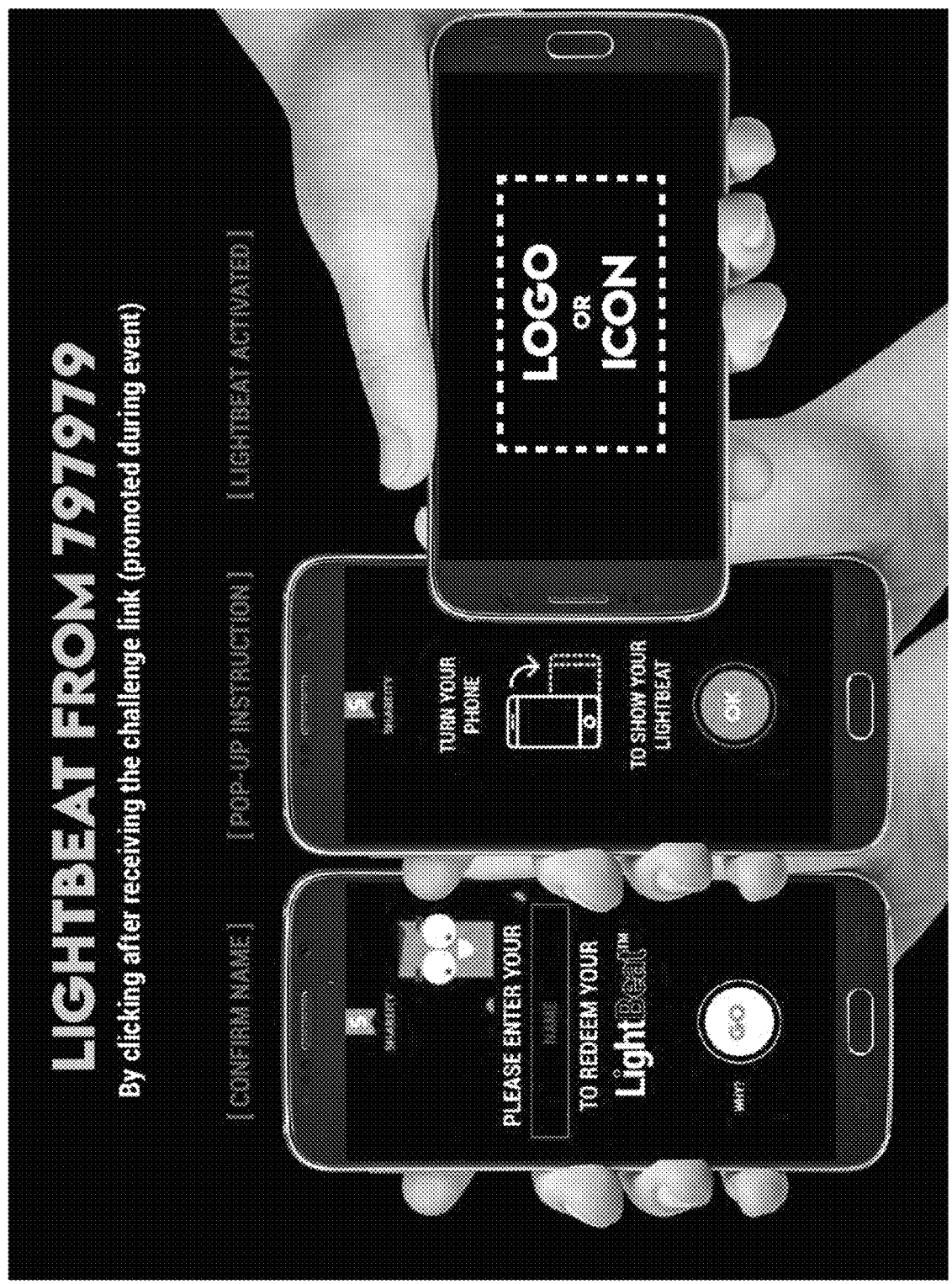
Figure 43:
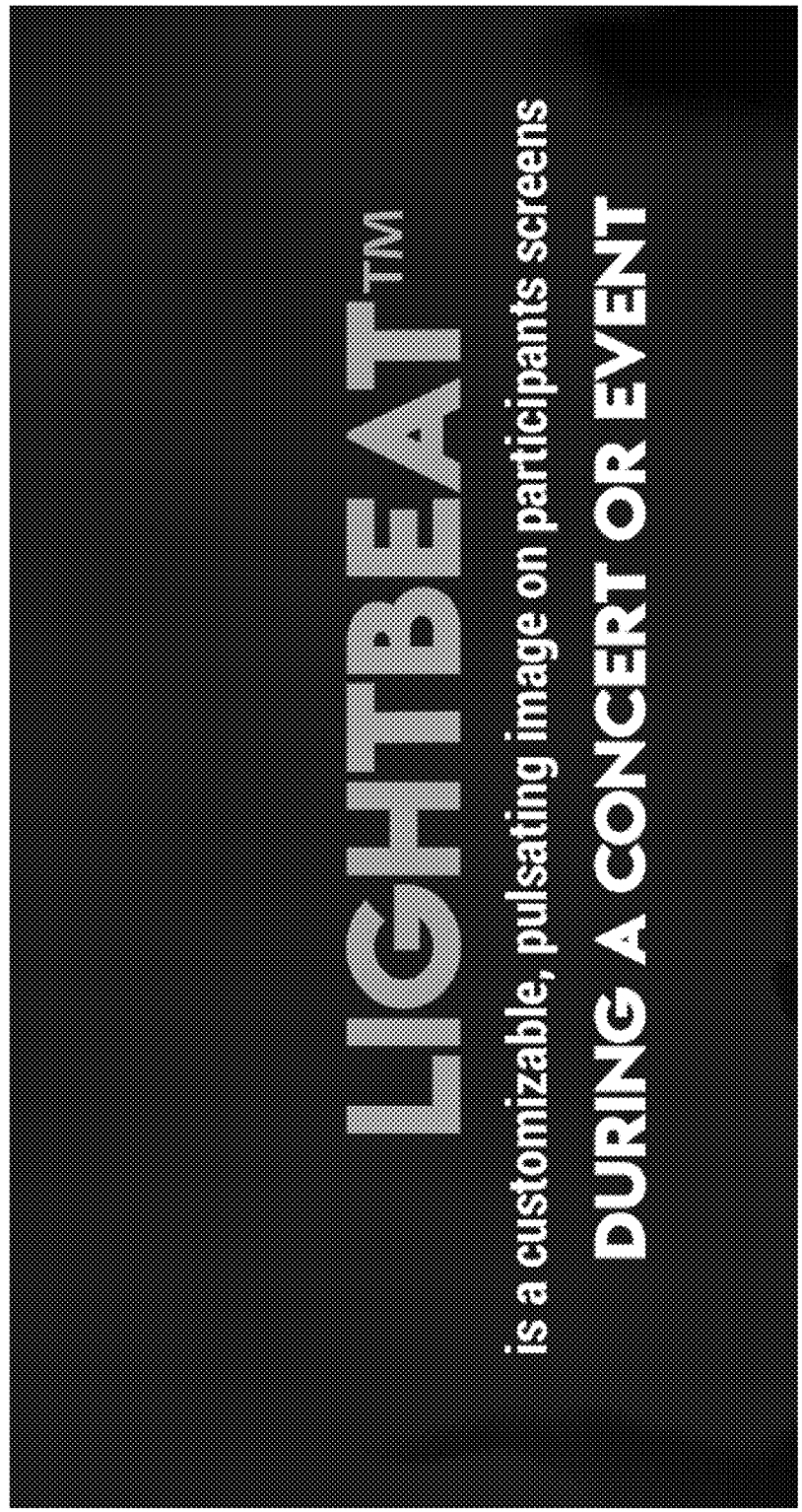
Figure 43A:
Figure 44:
Figure 45:
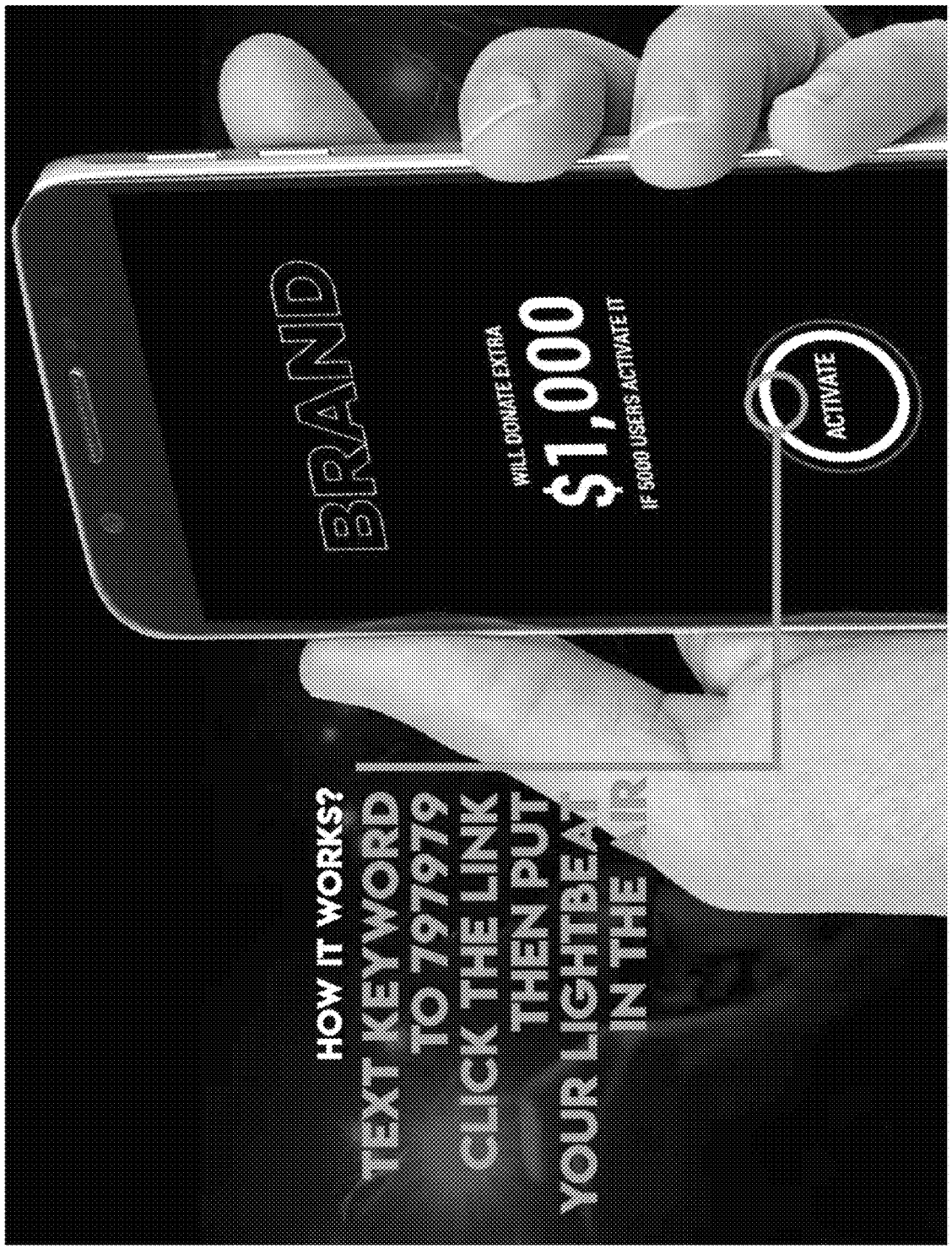
Figure 46:
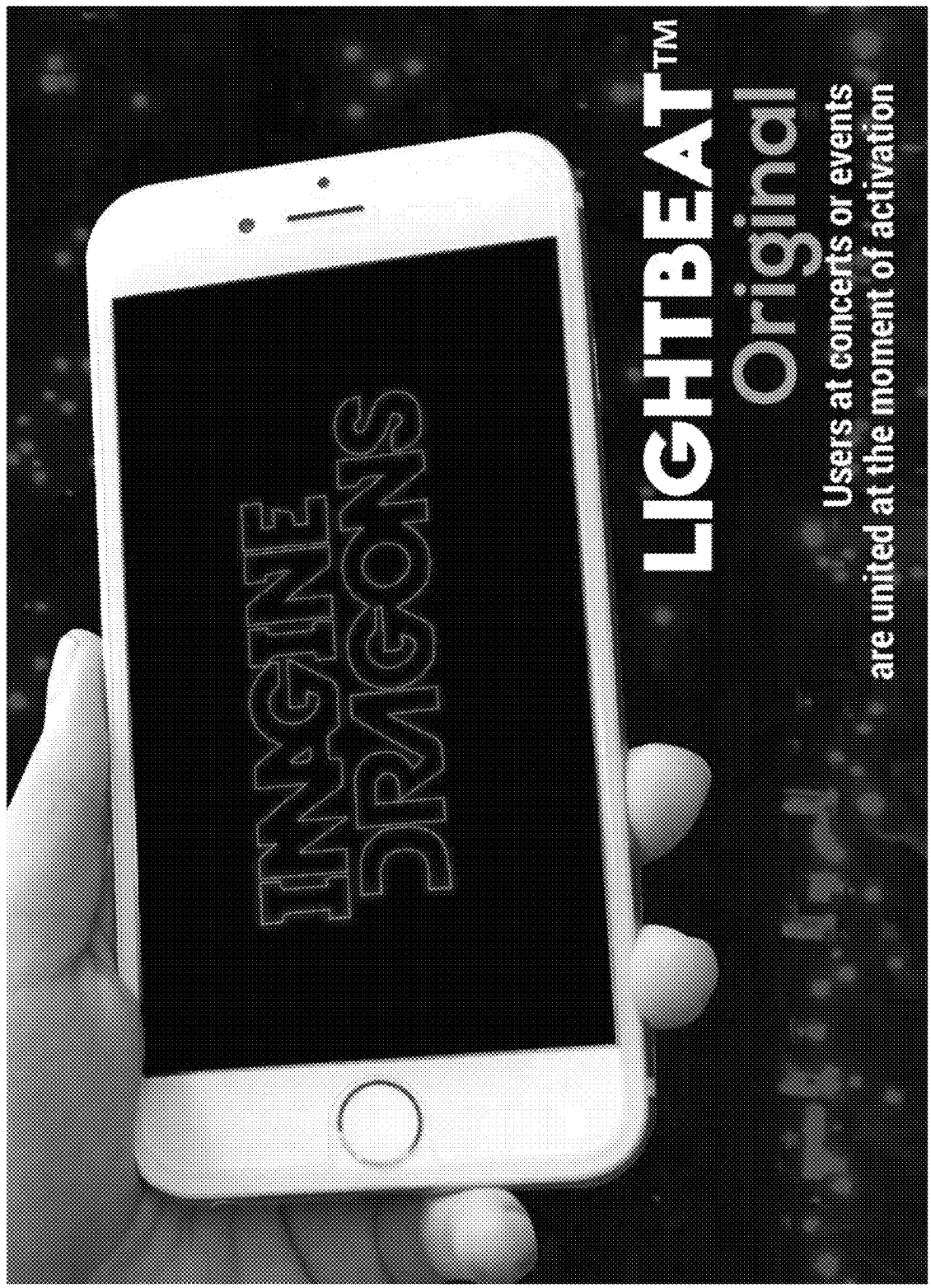
Figure 47:
Figure 48:
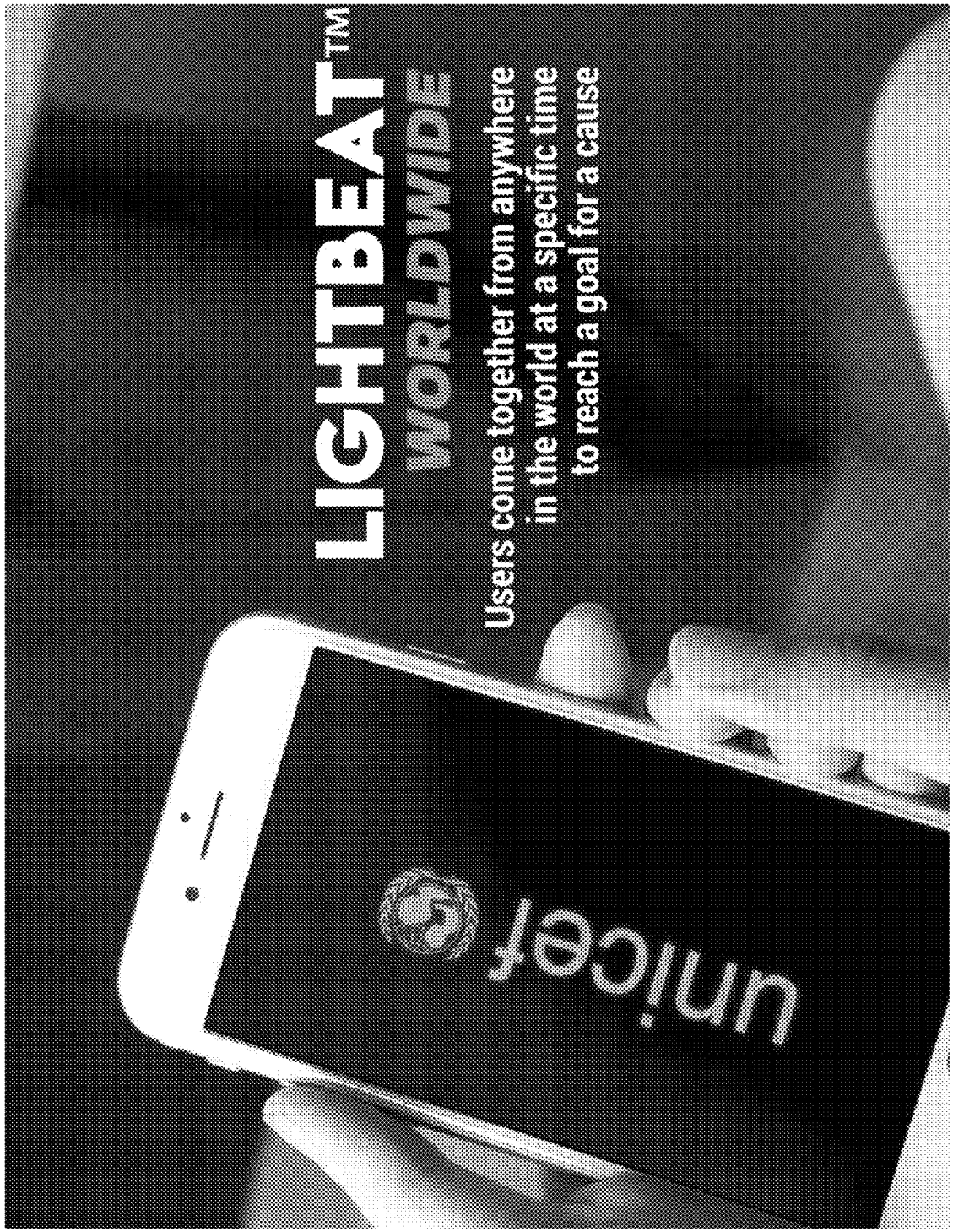
Figure 49:
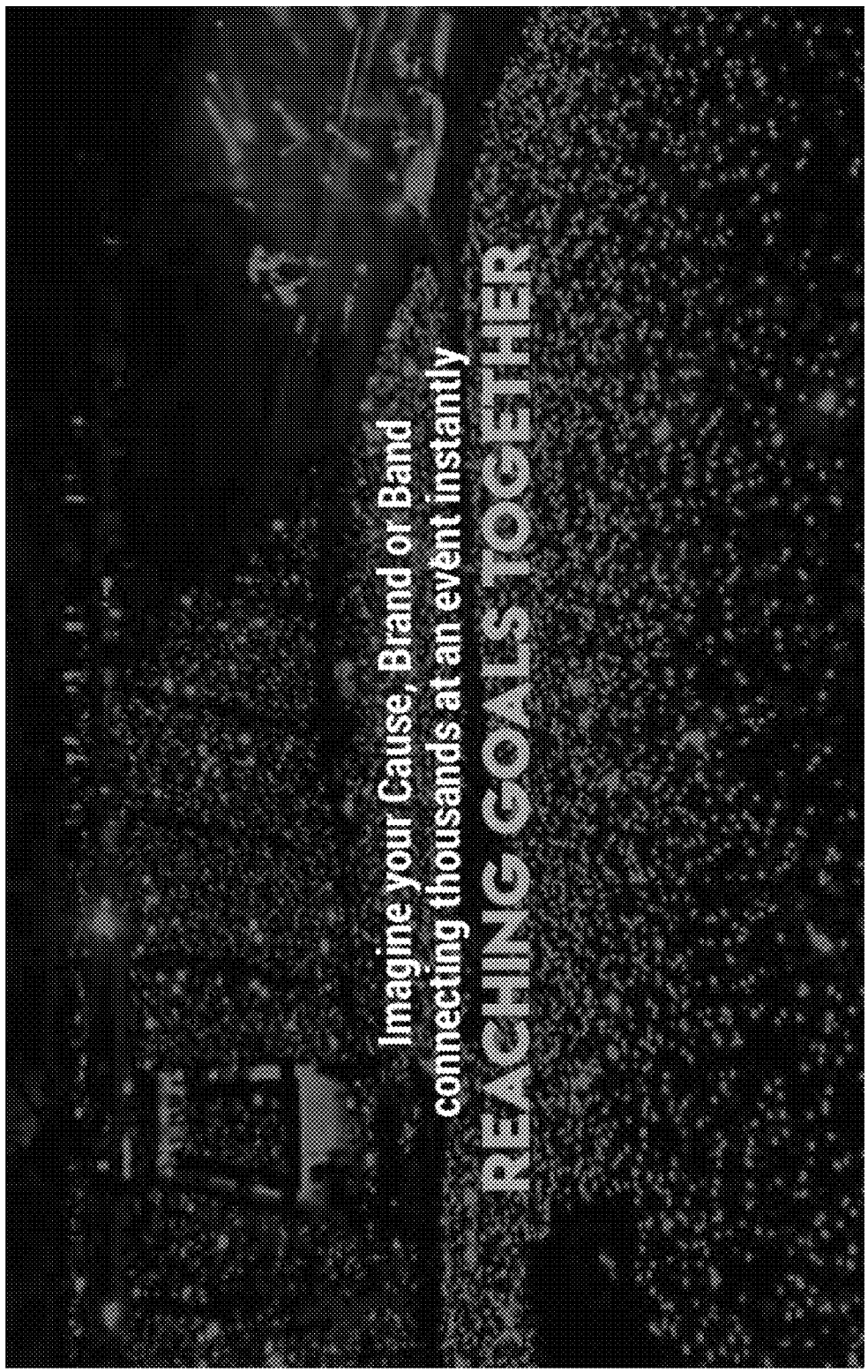
Figure 50:
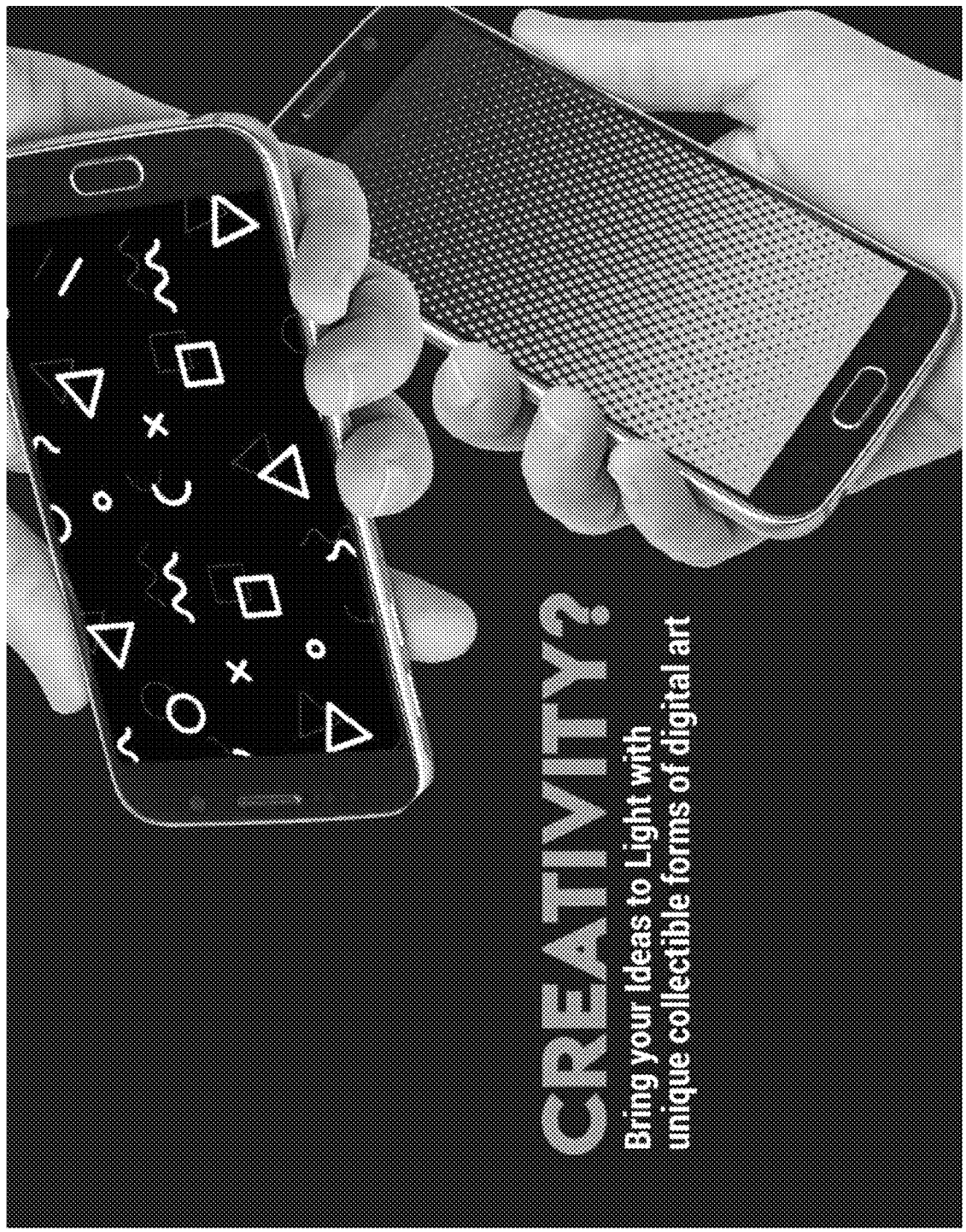
Figure 51:
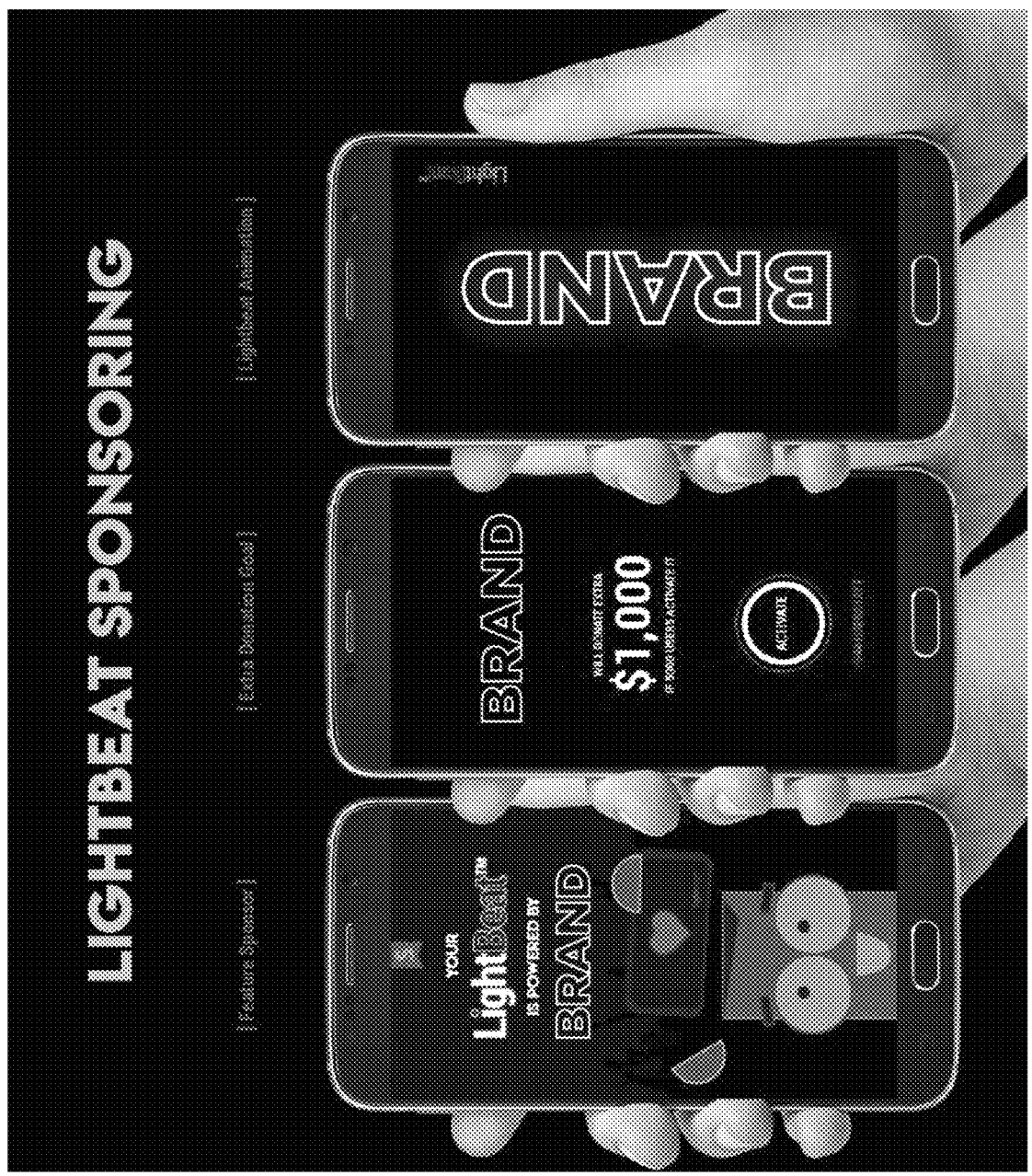

FIGS. 42-51 illustrate the receiving of a screen including a light beat button. FIG. 42 shows the use of light beats in a community, where access to the community provides access to a light beat button. FIGS. 42a shows use of light beats in a function or event. A code is provided that allows access to a website that sends a screen to the handheld device. Tests The screen provides access to a light beat button. As stated in FIG. 43, a light beat is a customizable pulsating image shown in the screen of a handheld mobile device and can be used during an event, although other uses are within the scope of these teachings. FIG. 43a shows other uses of a light beat for displaying logos of brands or causes. FIG. 44 shows the use of a light beat in the handheld mobile device. As shown in FIG. 45, the user of the handheld mobile device sends the request to a server and the server sends a webpage, displayed by the handheld mobile device, with a button that can activate the light beat, as shown in FIG. 46. Although the request shown in FIG. 45 is the texting of a keyword to the server, a variety of other requests, such as, but not limited to, sending the link to the server, or any other contact through the network to the server, are within the scope of these teachings. FIG. 47 shows another embodiment of the light beat where the light beat displays images from a live camera. FIGS. 48, 49 and 51 shows uses of the light beat. FIG. 50 shows other embodiments of the light beat.

The badge (the graphical activatable link), in one embodiment, is a tangible, marketable object. In that embodiment each copy of the graphical activatable link ("badge") is authenticated (in one instance the authentication is performed by creating an encrypted container file that includes all the copies of the graphical activatable link and each copy is assigned a unique identifier, such as a number; for instance, the encrypted container file can be created using "BitLocker" (see, for example, How to Create an Encrypted Container File With BitLocker on Windows, available at How to Geek, http://www.howtogeek.com/193013/how-to-create-an-encrypted-container-file-with-bitlocker-on-windows/ , which is incorporated by reference herein in its entirety and for all purposes) -other types of authentication and encryption are also possible; authentication is also possible by code, via encrypted code, or by encrypted data (see, for example, Chapter 5 in Rafael Pass, Abhi Shelat, A COURSE IN CRYPTOGRAPHY, ® 2010, a copy of which is incorporated by reference herein in its entirety and for all purposes). In that embodiment, "donation" refers to the payment for access to the graphical activatable link. The process for converting the graphical activatable link into a tangible marketable "object" includes the authentication each copy of the graphical activatable link. The process can also include the identification of each copy of the graphical activatable link with a different identifier for each copy. In these embodiments, a user can transfer the link to another user (the transfer can be for money or as a gift). Transfer of a copy of the graphical activatable link includes providing access to the link (where the link is authenticated by an encrypted container file, access includes access to that copy at the encrypted container file so that another user can display the copy of the graphical activatable link; where the link is authenticated by encrypted data, access includes access to the encrypted data). In one instance of this embodiment, activating the graphical activatable link can provide information about the graphical image related to the graphical activatable link-for example, but not limited to, who designed the image. In one exemplary embodiment, the graphical activatable link includes a copyrightable object. Some examples, these teachings not been limited only to those examples, of copyrightable objects are sketches, drawings, digitally constructed figures, animated figures, video images, images of a particular work. In one instance, not a limitation of these teachings, the image is an image of a work of art or a unique design. Since the graphical activatable link can be activated and displayed, the image can be displayed using display equipment such as projectors.

A link which can be authenticated using an authentication scheme similar to the authentication described in RFC 7235-HTTP/1.1 Authentication, which is incorporated by reference herein in its entirety and for all purposes. The authentication can be a two-step authentication where an authentication code is sent to the user using the link.

Another benefit of authentication is that it creates identification of the specific graphical activatable link. Since there is a record of the user that owns the specific graphical activatable link, the graphical activatable link can be used for identification.

The above described examples are examples of providing value to actions and/or objects and to social influence data resulting from those actions and/or objects. In the present disclosure, "nodes" are created for actions, such as responding to a challenge, and the nodes can include objects such as pictures or videos and other objects. Once a node is established, the node has a corresponding link which can be authenticated (similar to authentication described in RFC 7235-HTTP authentication). When the node (or link) is shared, as others interact with the node, the interaction information is added to the node. A value can be provided to the node (link) based on the transactions related to the node or the potential of the node for having transactions related to the node.

Figure 52:
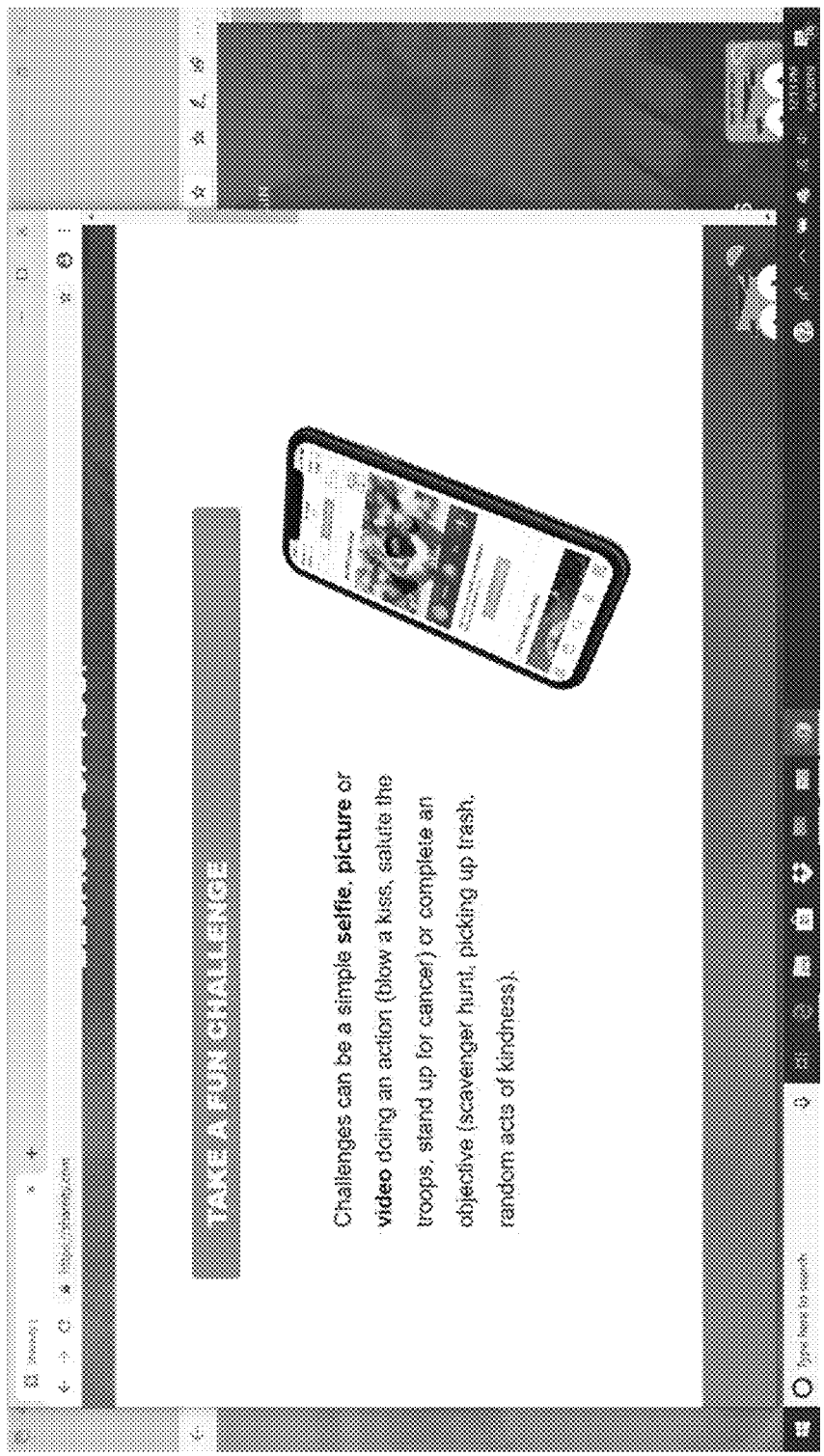
FIGS. 52-78 are graphical representations of still another embodiment of the system of these teachings.
Figure 53:
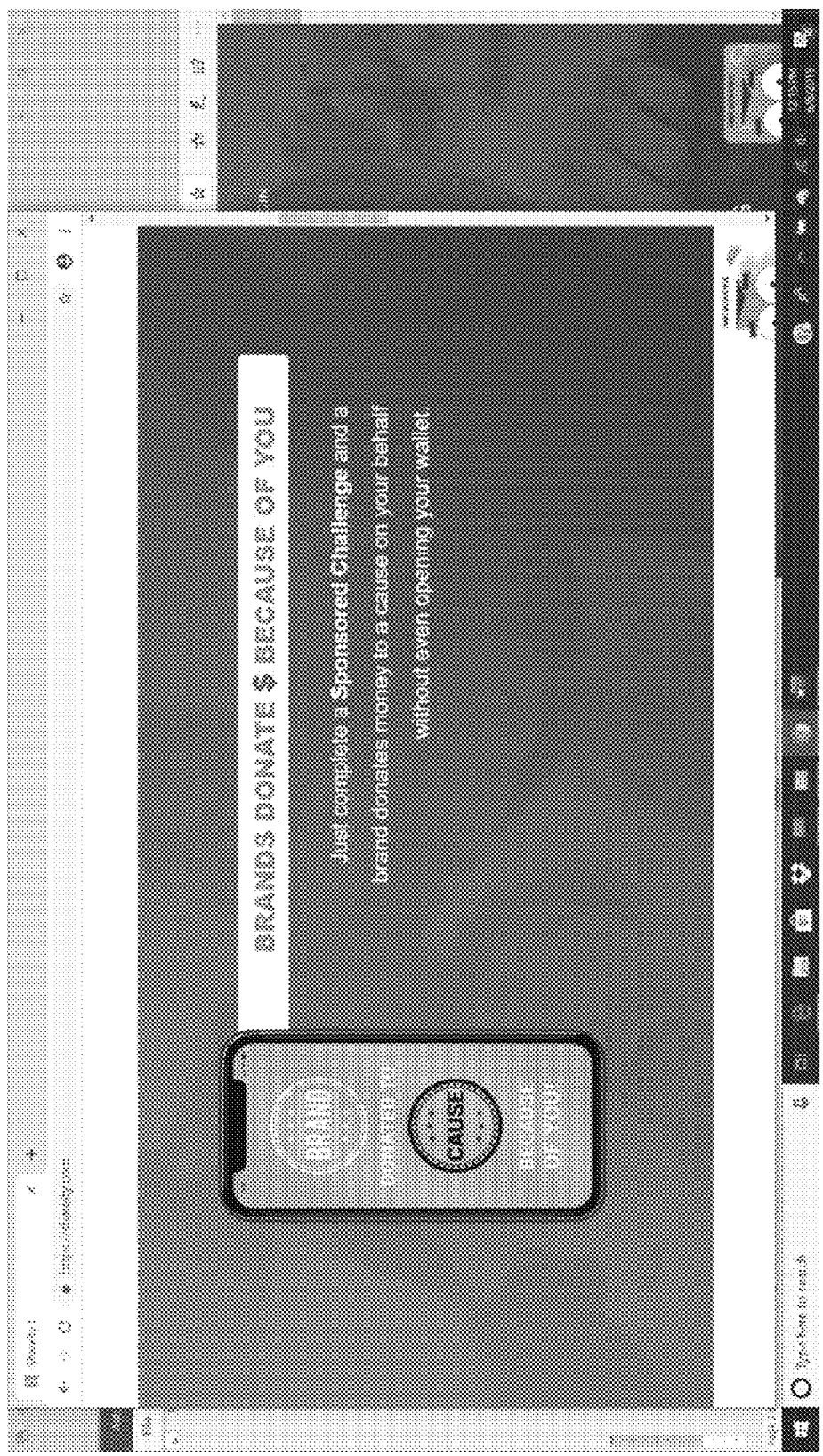
Figure 54:
Figure 55:
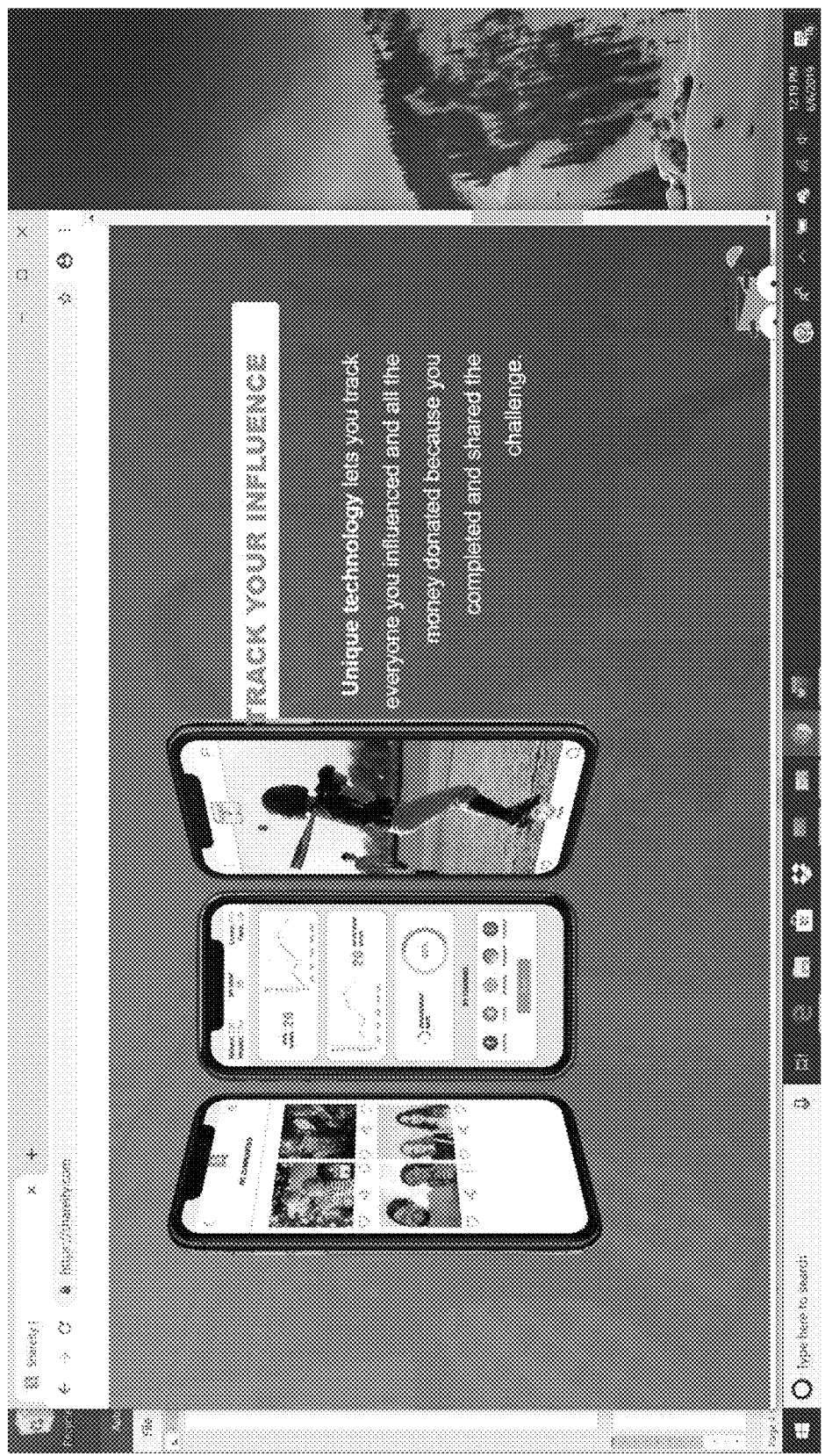
Figure 56:
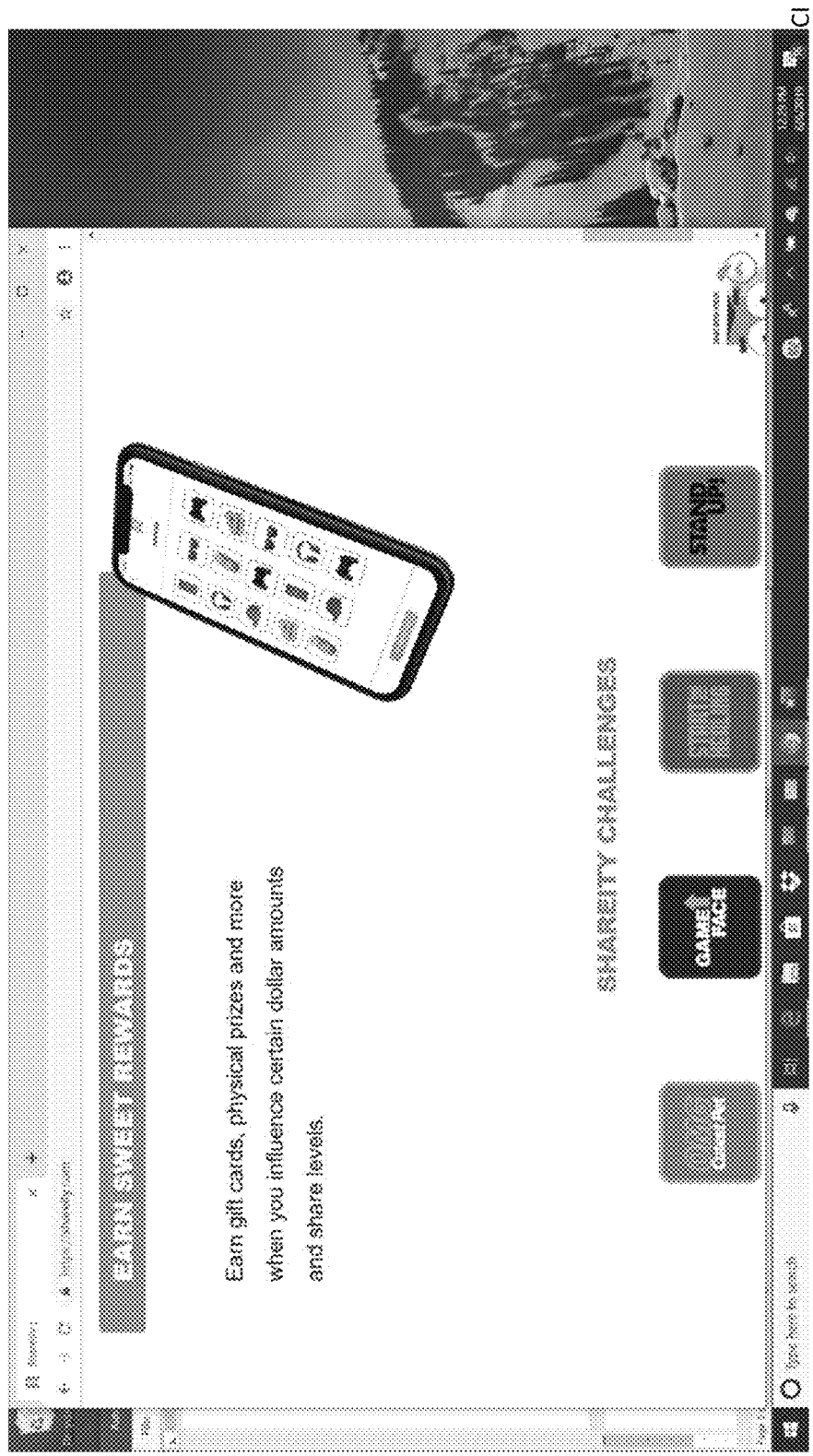

An example will be presented below for the providing of value to actions in the response to a challenge by performing an action or completing an objective. FIG. 52 provides examples of the challenge. In a sponsored challenge, an outside entity donates to a cause open response to the challenge. When the user, as in FIG. 54 shares the challenge with his/her social network, the value of the link increases. It is possible, as in FIG. 55, to track that increase in value due to the social influence. As the value of the link increases, the user can obtain rewards from that increase in value (as in FIG. 56).

Figure 57:
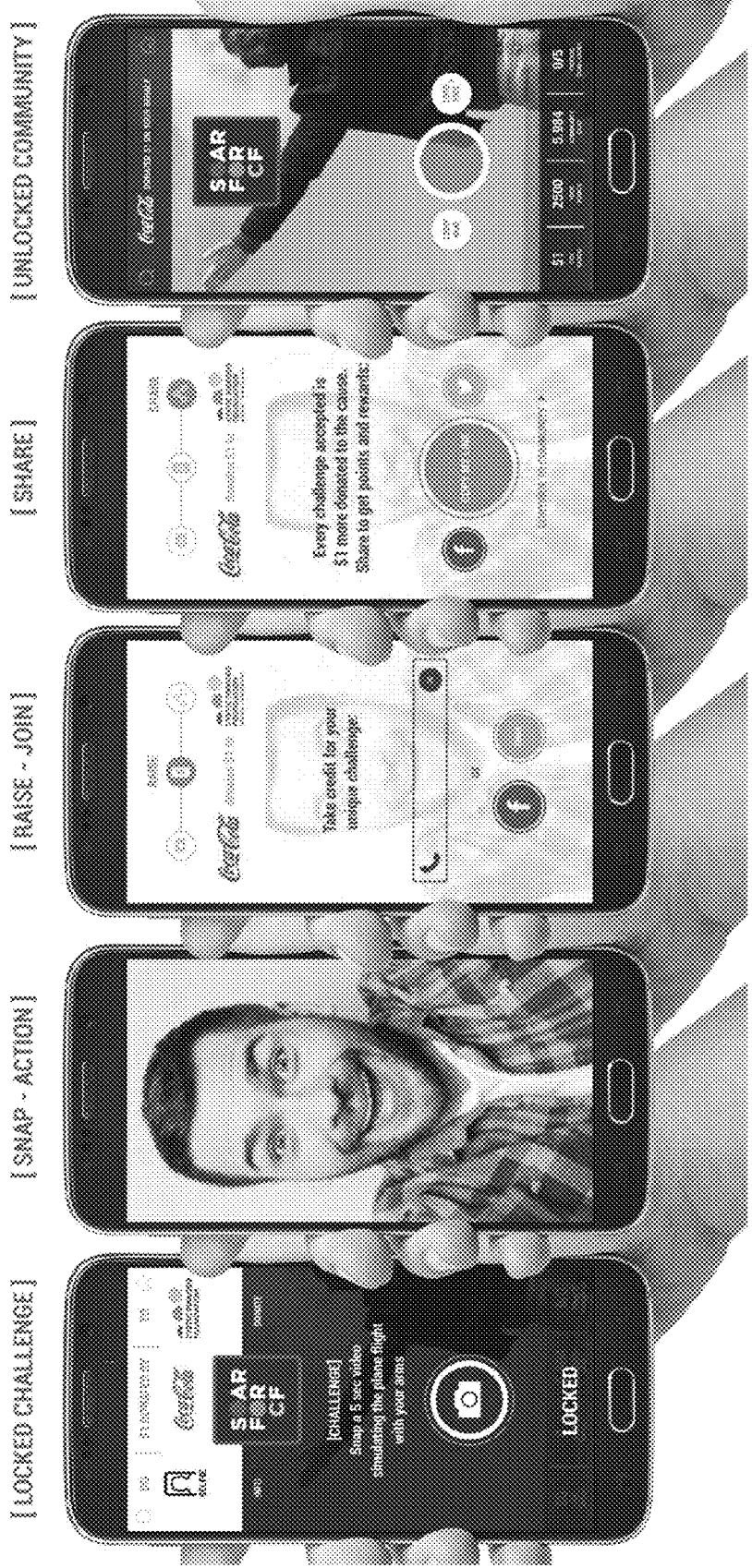
Figure 58:
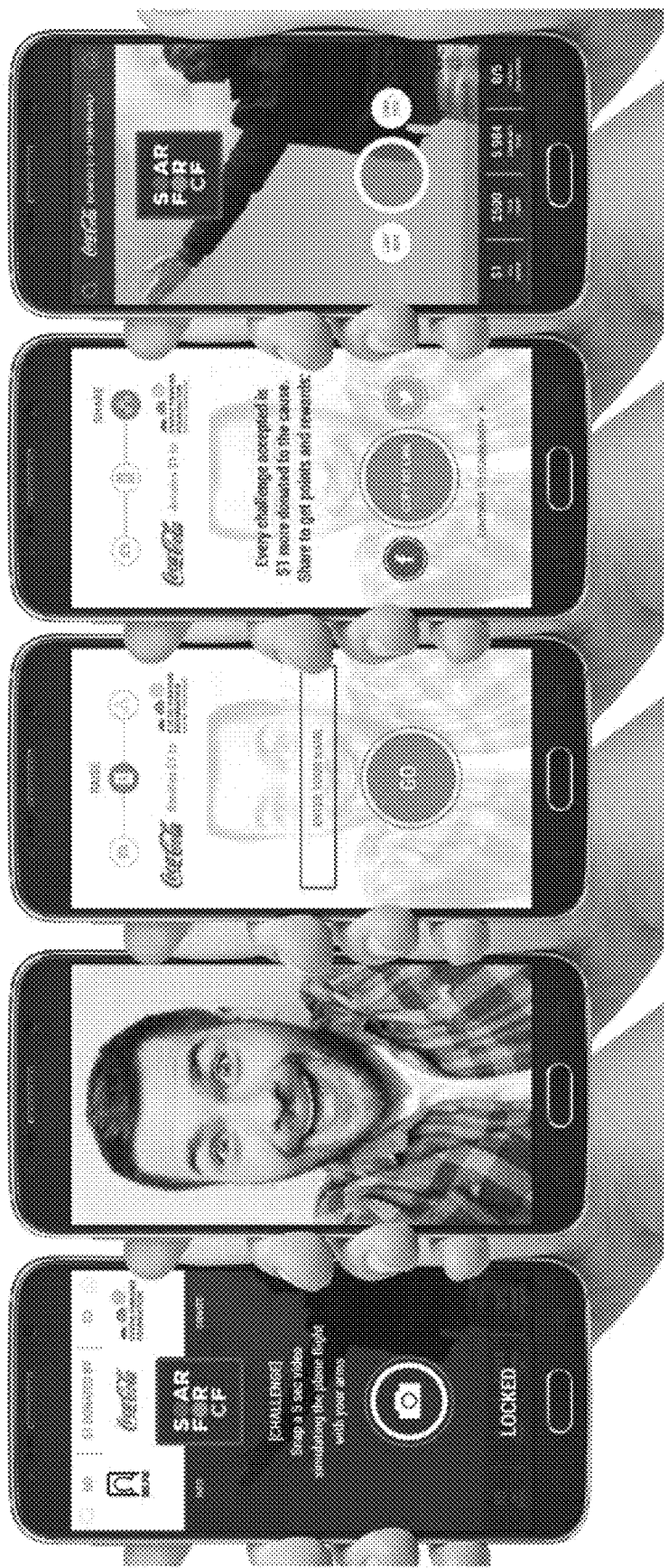
Figure 59:
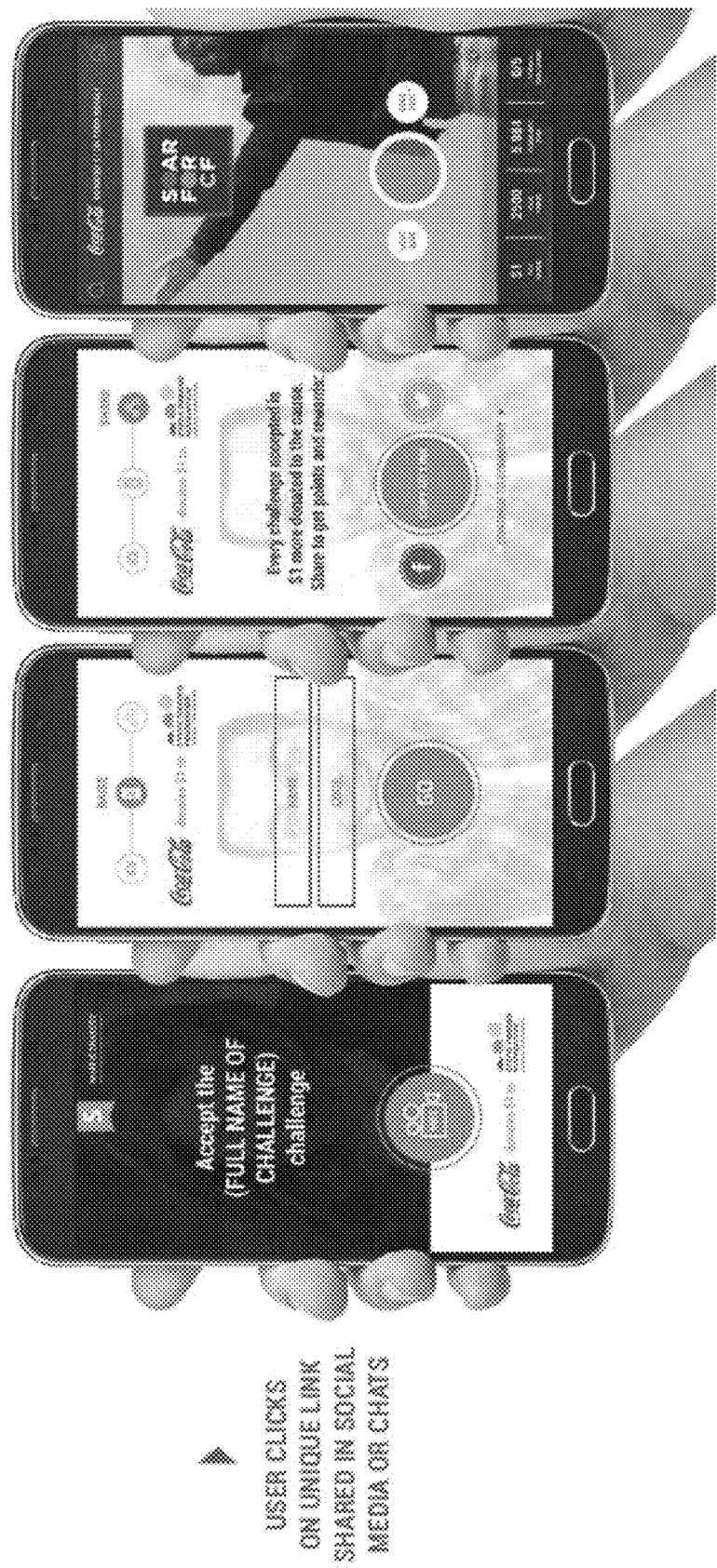
Figure 60:
Figure 61:
Figure 62:
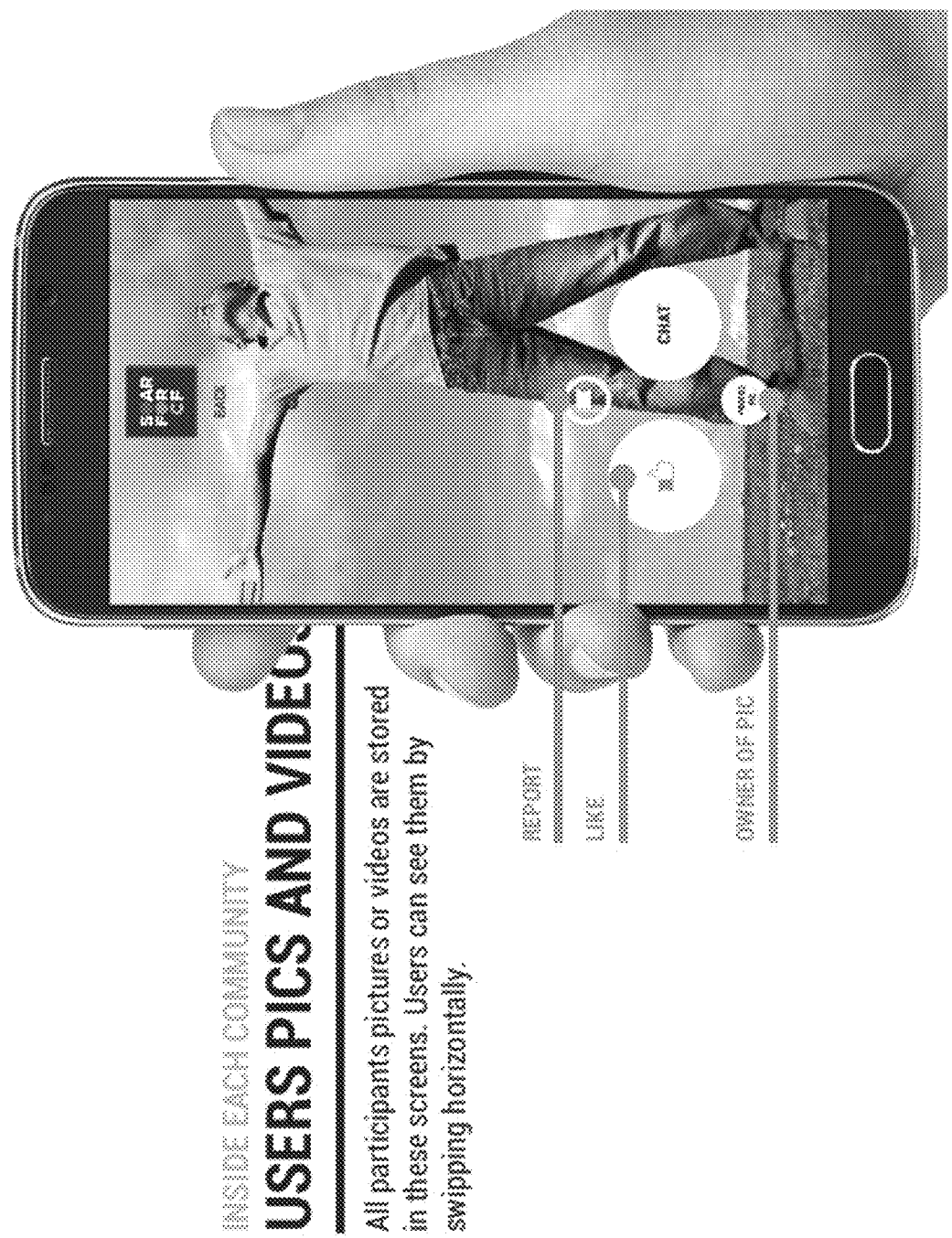
Figure 63:
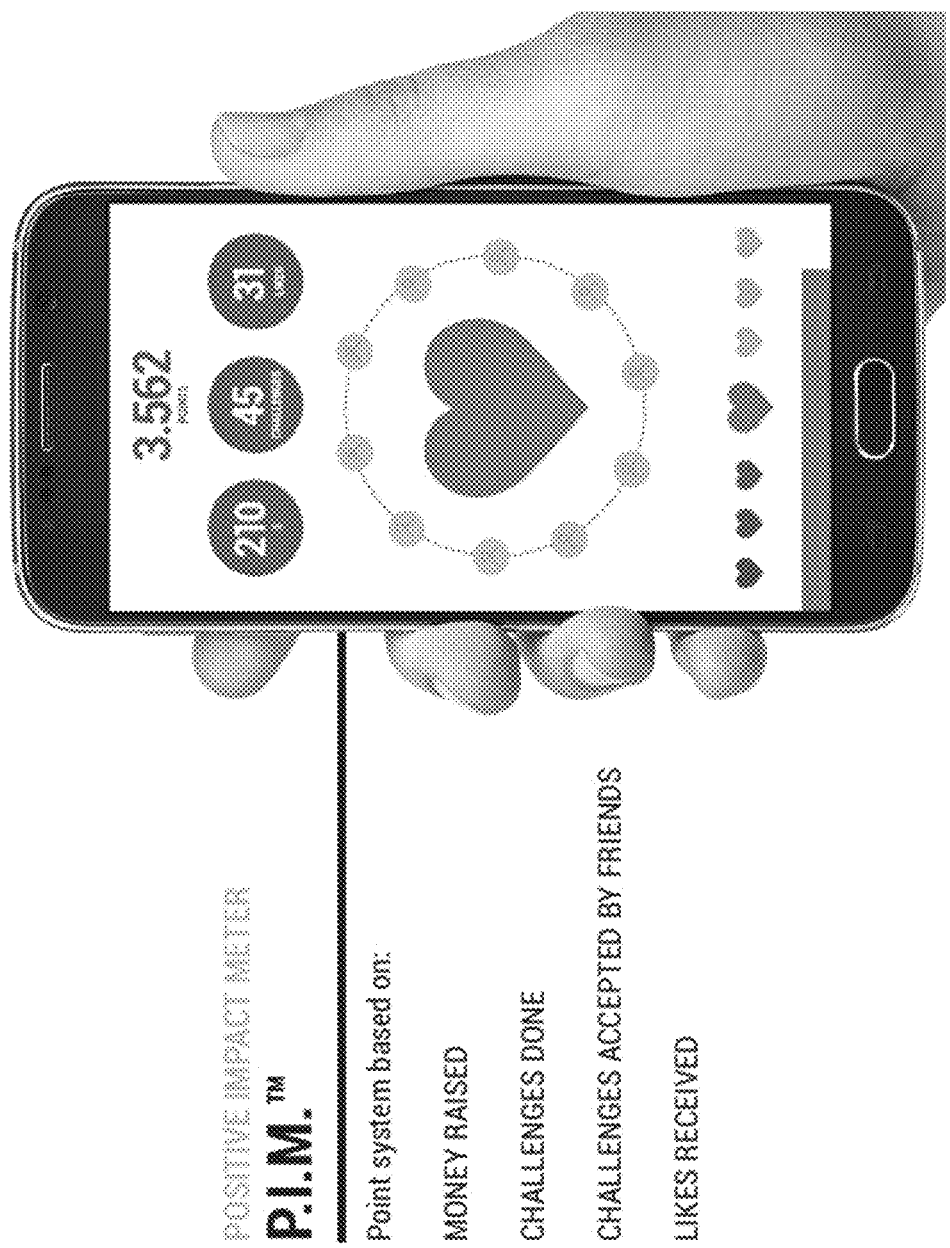
Figure 64:
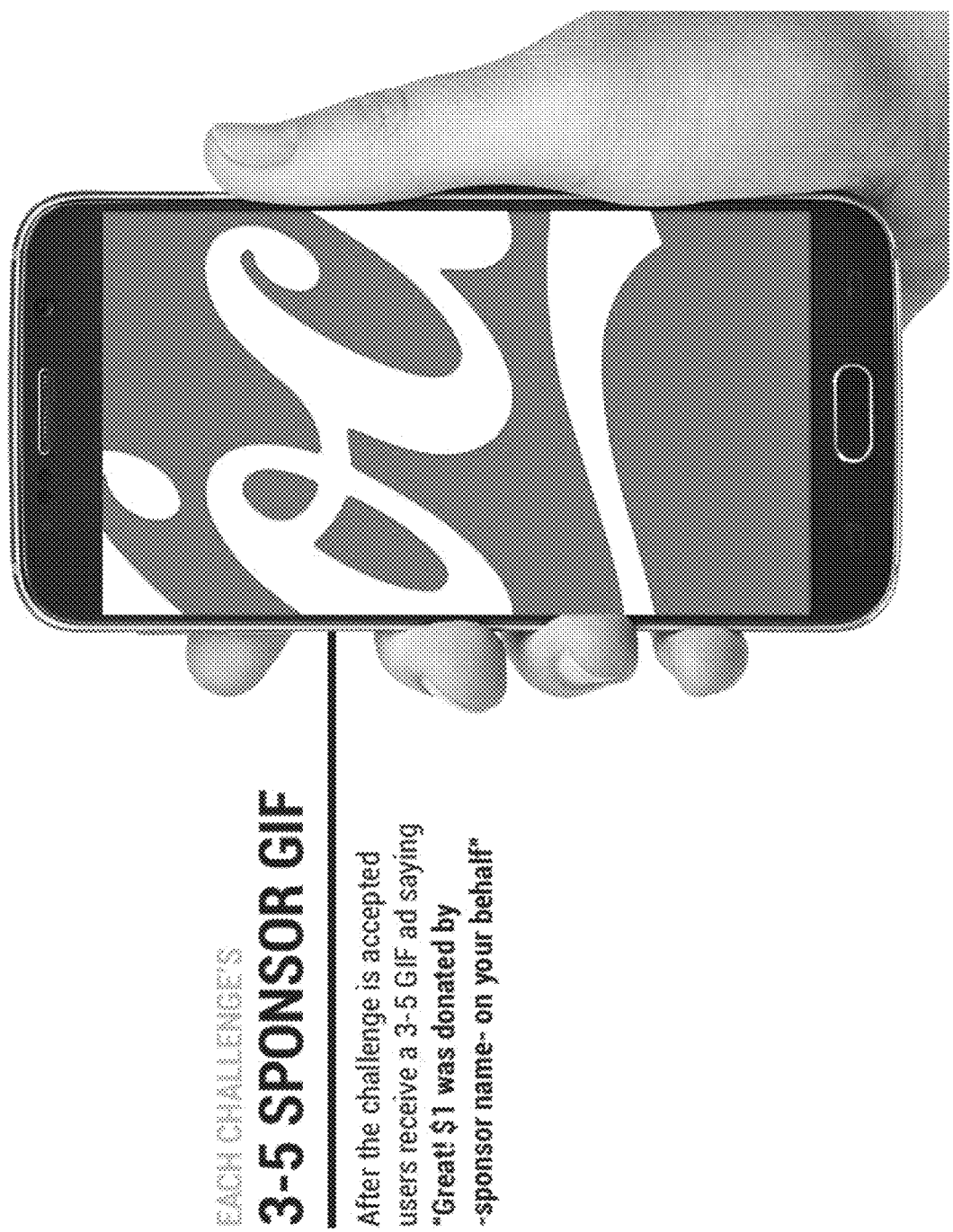
Figure 65:
Figure 66:
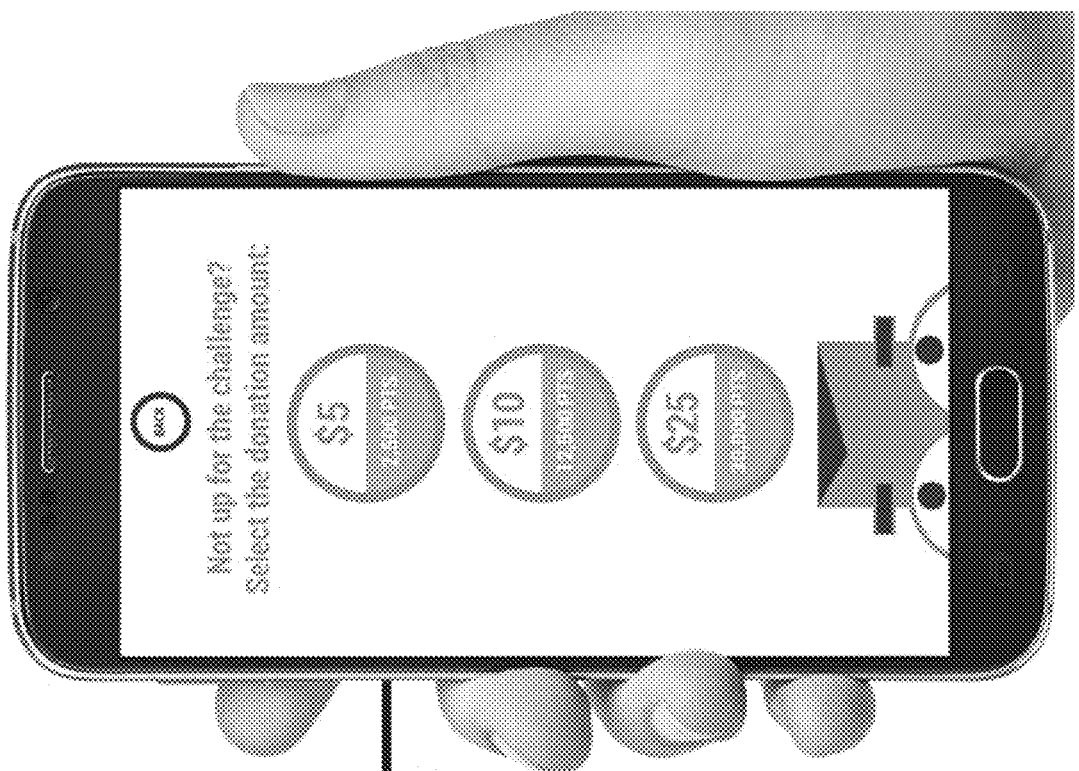
Figure 67:
Figure 68:
Figure 69:
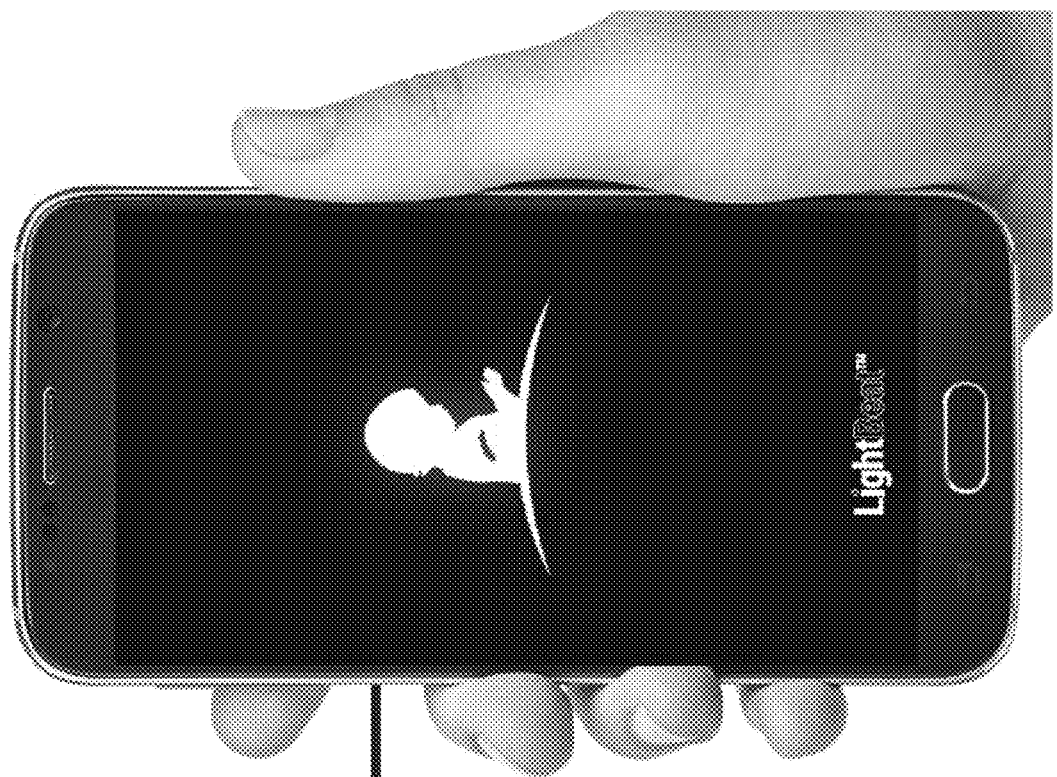
Figure 70:
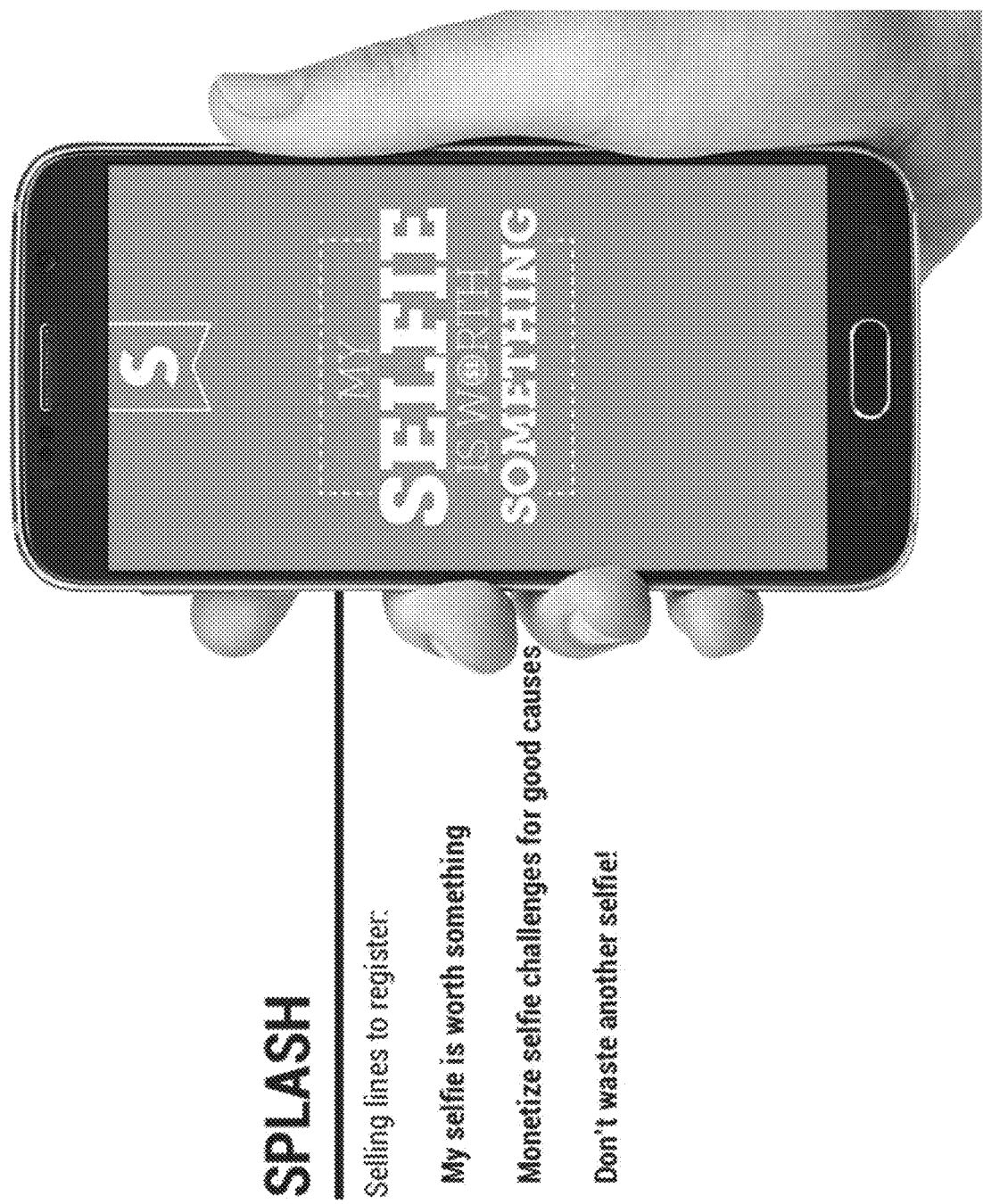
Figure 71:
Figure 72:
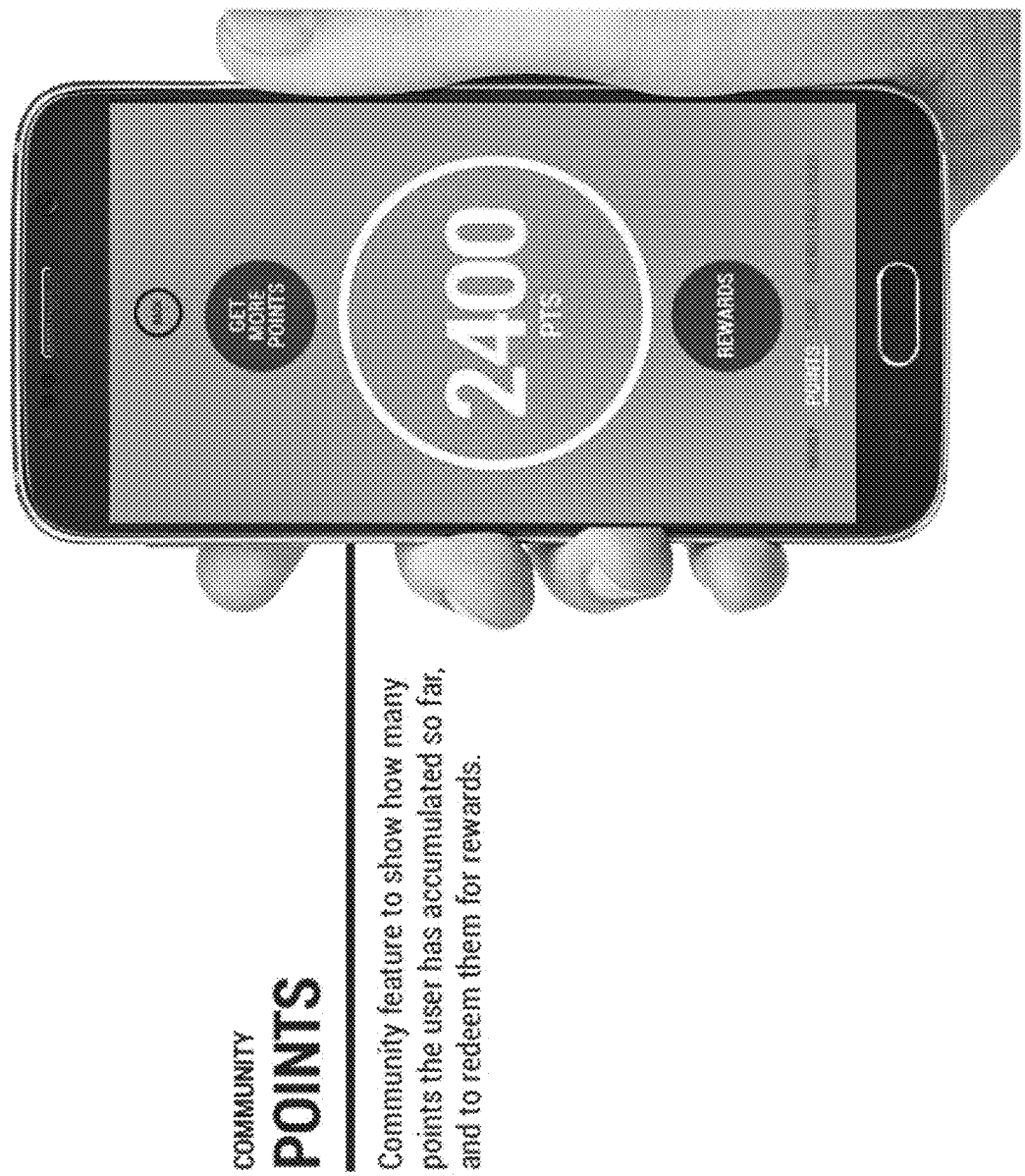
Figure 73:
Figure 74:
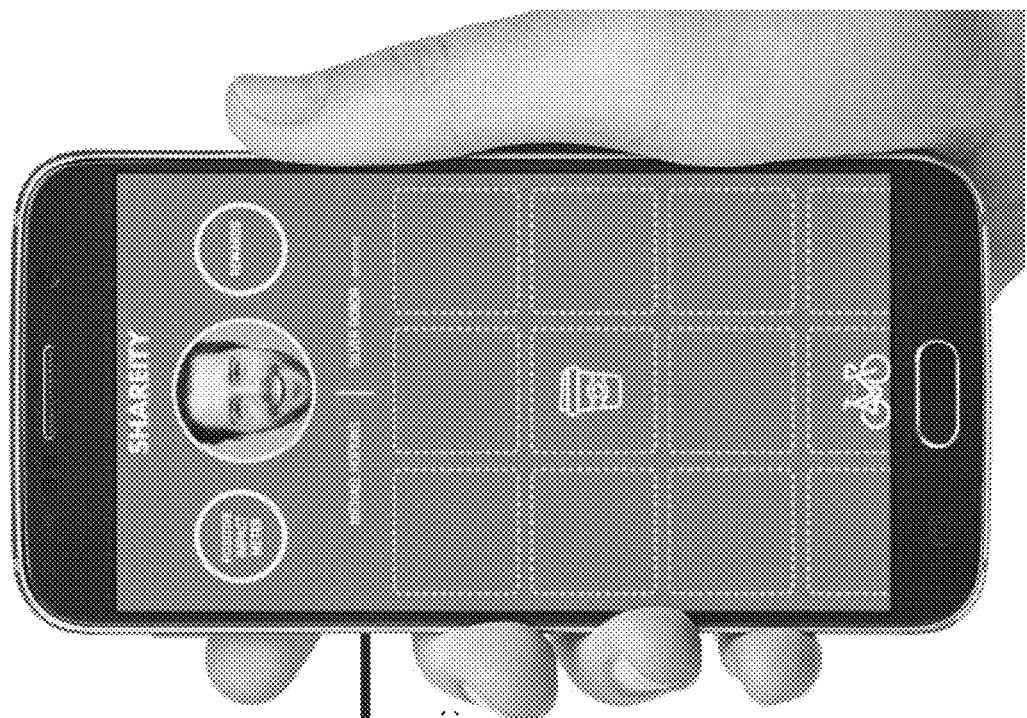

FIGS. 57-74 provide more digital information on the example of a challenge resulting in in donation. In FIG. 57, the user receives a challenge directly from an application of the website server. The user then performs a response to the challenge, takes a picture to prove that the challenge has been responded to and provides that picture. The response to the challenge resulting in donation to a cause. The user now shares the challenge with his/her social network and the community of people responding to the challenge is unlocked. In FIG. 58, the user requests the challenge using a text message. In FIG. 59, the user receives the challenge from the link (a unique link) created when a friend response to the challenge. As shown in FIG. 60, before the responses received the challenge is locked and responding to the challenge unlocks the challenge community (FIG. 61). The pictures and videos generated in responding to the challenge are part of the data stored at the node (link) (see FIG. 62). A point system as shown in FIG. 63, can be used to attach a value to the node (link) based on the amount of money raised, the number of challenges performed, the number of friends that accepted the challenge and the likes received by the node (link). After the response to the challenge is accepted, the user receives an image that reports the amount of money donated by a third-party to a cause (see FIG. 64). A guide to the features of the application is provided using a cartoon character (Shareity Steve as shown in FIG. 65). If the user does not want to respond to the challenge, the user can donate directly to the cause and get points for that amount donated (see FIG. 66). For each cause, the number of members in the community of supporters of the cause and the points related to the cause are summarized (see FIG. 67). For a cause does not have a sponsor, users can donate to the cause in exchange for points (see FIG. 68). For each cause, there is a pulsating light beat (see FIG. 69). A splash screen can be used to provide slogans (see FIG. 70). For each cause (and its community), a summary of how much has been raised and how much the user has raised is provided (see FIG. 71). The total count of the number of points that a user has accumulated is also provided (see FIG. 72) and the points can be redeemed for rewards (see also FIG. 56). A summary of the friends, with whom the user shared the challenge and the friends responded, is also provided (see FIG. 73). As shown in FIG. 74, a badge, a graphical activatable link, is provided the user to the user for every challenge done and is displayed on a badge wall screen with buttons that provide access to the positive impact meter, which summarizes the value of the money raised, the number of challenges done, the number of challenges accepted by friends and the likes received, factors that are used to determine the value of nodes (links) associated with that user, and a bottom lead provides the rewards that the user can claim, converting the value of the nodes (links) associated with the user into rewards. The brackets can be authenticated, either individually or by the authentication of the challenge link that produced them.

Figure 75:
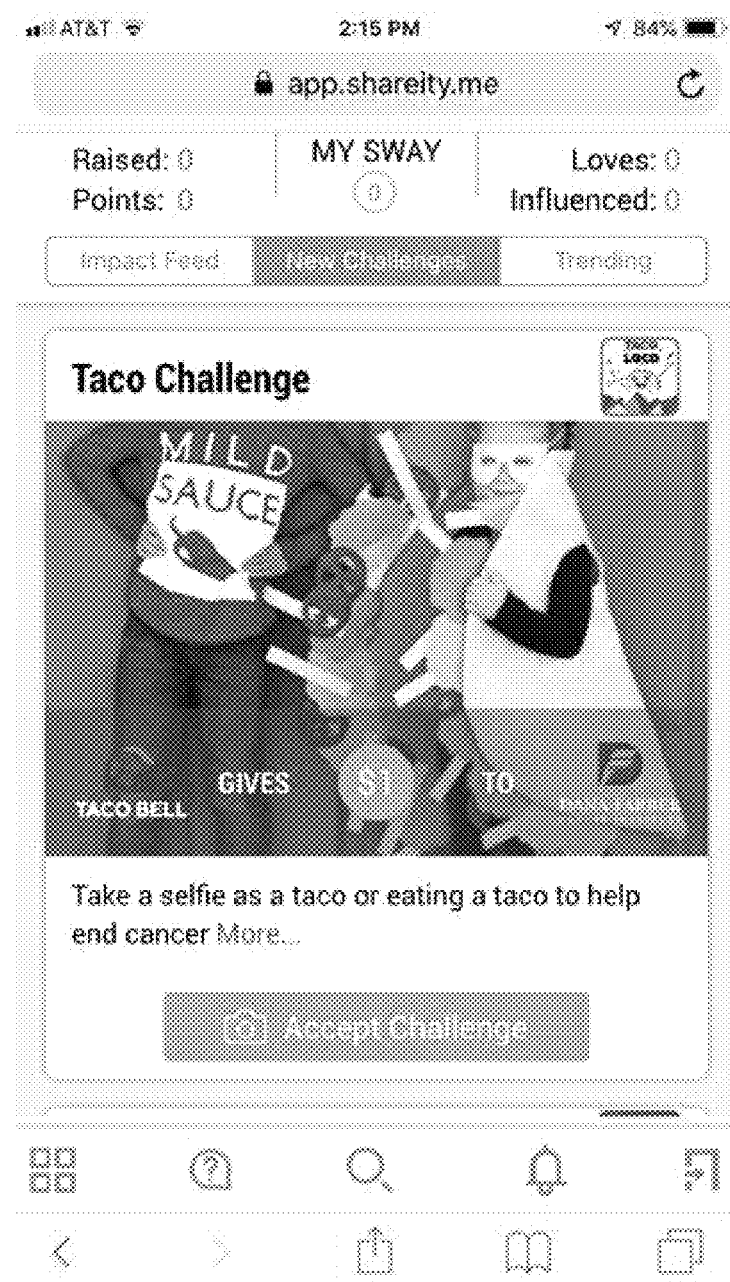
Figure 76:
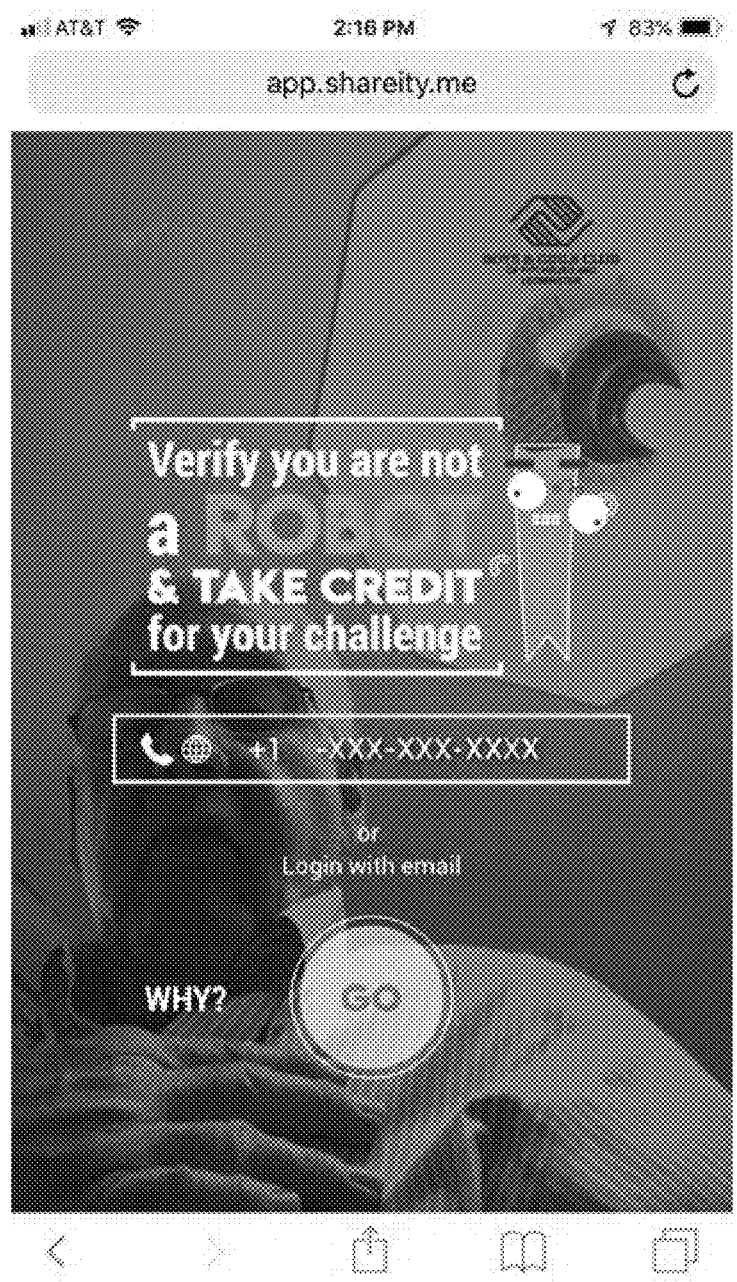
Figure 77:
Figure 78:
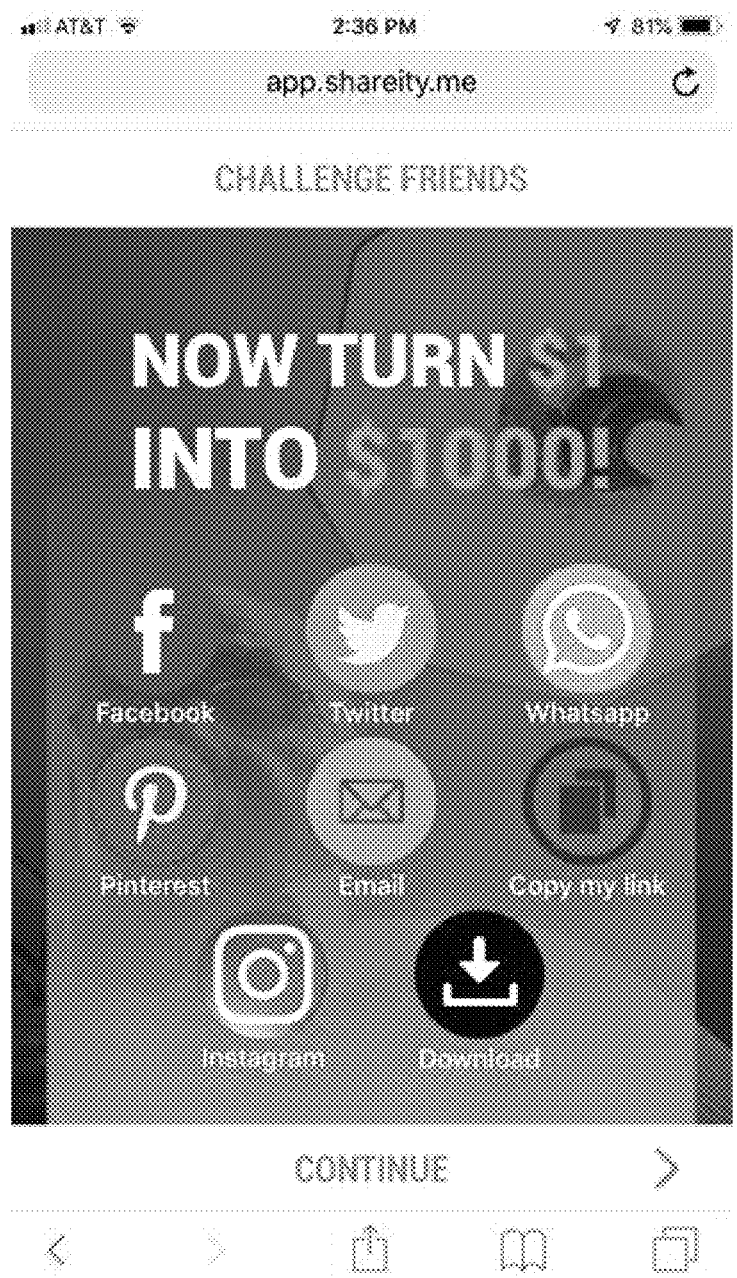

In one instance, the user of the handheld mobile device accesses an application and the server, for example, but not limited to, app.shareity.me, and receives description of challenges from the application, as shown in FIG. 75. The user selects a challenge, activates the accept challenge bottom, and provides a response to the challenge and sends it to the application. The application then provides a user verification screen, as shown in FIG. 76. Upon providing the verification, which in the embodiment shown is a phone number, the application will, in one instance, respond with sending a code which, when entered, results in authentication. The user can then thank the parties providing donations after the response to the challenge, as in FIG. 77. After the response from the user thanking the sponsoring party, the user can shares the challenge with a user's social network as in FIG. 78.

The above example has all the components of providing value to a node (link). As a user responds to a challenge a node (link) is formed and information related to the response is attached (added) to the node (link). The node (link) is authenticated. When the user shares the challenge, additional information is added to the node (link). A value is assessed for the node (link) based on the amount of money received for the cause, the number of members in the community the number of friends that accepted the challenge and the likes received by the node (link). The user can use that value to obtain rewards such as gift cards or physical prizes.

The following is a disclosure by way of example of a device configured to execute functions (hereinafter referred to as computing device) which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit ("ASIC") customized logic circuitry, such as a controller or microcontroller, a digital signal processor, or any other form of device that can fetch instructions, operate on pre-loaded/pre-programmed instructions, and/or followed instructions found in hardwired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

Although these teachings has been described with respect to various embodiments, it should be realized these teachings are also capable of a wide variety of further and other embodiments within the spirit and scope of the appended claims.

What is claimed is:

1. A system for providing a graphical activable link, the system comprising:
   a hand held mobile communication device;
   a server configured to receive information from the hand held mobile communication device;
   the hand held mobile communication device and the server comprising one or more processors, the one or more processors being configured to:
     send a request to the server for activities that require an action as a response;
     receive, from the server, activities that require an action as a response;
     select one activity that requires action as a response; selection performed by a user of the hand held mobile communication device;
     provide, upon performing the action and obtaining, from the server, validation of performance of the action, from the server, of , the graphical activable link as a result of the action by the user; the graphical activable link having a corresponding node;
     adding and storing information to the corresponding node as a user shares the graphical activable link—or performs actions; and
     obtain a value, the value related to a number of times the graphical activable link has been shared and— number of parties shared with that have performed the action; the value can be obtained for actions in other platforms; a party shared with performing the action is a similar act to said user performing the action;
     wherein the value corresponds to a number of returning of similar acts.

2. The system of claim 1 wherein the one or more processors are also configured to authenticate the graphical activable link.

3. The system of claim 1 wherein the action by the user is the response to a challenge, the challenge requiring performing of the action; and wherein the user shares the graphical activable link with members of a social network of the user.

4. The system of claim 3, wherein the one or more processors are also configured to authenticate the graphical activable link.

5. The system of claim 3, wherein a donation is made to a cause after the response to the challenge; and wherein said value is related to a monetary impact of the actions performed.

6. The system of claim 3, wherein the response to the challenge comprises providing a photo or providing a video.

7. The system of claim 5, wherein a third-party make the donation.

8. The system of claim 7, wherein the one or more processors are also configured to provide to the user, after the response to the challenge, an announcement from the third-party.

9. The system of claim 3, wherein the one or more processors are also configured to provide commentary user, access to a community of users who have responded to the challenge.

10. The system of claim 9, wherein the access to said community of users comprises access to an animation, the animation being representative of the cause.

11. The system of claim 10, wherein the animation comprises a pulsating lighted object.

\* \* \* \* \*